US009278672B2

(12) United States Patent
Otake

(10) Patent No.: US 9,278,672 B2
(45) Date of Patent: Mar. 8, 2016

(54) DRIVING SUPPORT APPARATUS

(75) Inventor: Hirotada Otake, Toyota (JP)

(73) Assignee: TOYOTA JIDOSHA KABUSHIKI KAISHA, Toyota-Shi, Aichi (JP)

(*) Notice: Subject to any disclaimer, the term of this patent is extended or adjusted under 35 U.S.C. 154(b) by 0 days.

(21) Appl. No.: 14/357,791

(22) PCT Filed: Nov. 14, 2011

(86) PCT No.: PCT/JP2011/076208
§ 371 (c)(1),
(2), (4) Date: May 13, 2014

(87) PCT Pub. No.: WO2013/072994
PCT Pub. Date: May 23, 2013

(65) Prior Publication Data
US 2014/0303868 A1 Oct. 9, 2014

(51) Int. Cl.
B60T 7/12 (2006.01)
G08G 1/16 (2006.01)

(52) U.S. Cl.
CPC .. *B60T 7/12* (2013.01); *G08G 1/166* (2013.01)

(58) Field of Classification Search
CPC ................................. B60T 7/12; G08G 1/166
USPC ......................................................... 701/70
See application file for complete search history.

(56) References Cited

U.S. PATENT DOCUMENTS

| 6,487,477 | B1 * | 11/2002 | Woestman et al. | 701/22 |
|---|---|---|---|---|
| 7,466,227 | B2 * | 12/2008 | Chen et al. | 340/539.13 |
| 2010/0241376 | A1 * | 9/2010 | Kikuchi et al. | 702/63 |
| 2011/0054768 | A1 * | 3/2011 | Sullivan | 701/123 |
| 2011/0093178 | A1 * | 4/2011 | Yamada et al. | 701/70 |

FOREIGN PATENT DOCUMENTS

| JP | 2005-173909 | 6/2005 |
|---|---|---|
| JP | 2009-126483 | 6/2009 |
| JP | 2010-015254 | 1/2010 |
| JP | 2010-191625 | 9/2010 |
| JP | 2010-244308 | 10/2010 |
| JP | 2011-154619 | 8/2011 |

* cited by examiner

*Primary Examiner* — James Trammell
*Assistant Examiner* — Michael Berns
(74) *Attorney, Agent, or Firm* — Finnegan, Henderson, Farabow, Garrett & Dunner LLP

(57) ABSTRACT

A driving support apparatus is provided with a support control device configured to calculate, based on a remaining distance from a stop position at which a vehicle stops by stop indication of a first traffic signal located in a travel direction of the vehicle to a point of the first traffic signal, an estimated variation distance for a second traffic signal located in the travel direction of the vehicle after the first traffic signal, and create a target vehicle travel state obtained by changing timing to start stopping support at the second traffic signal based on the estimated variation distance; and a support device capable of outputting driving support information to support driving of the vehicle based on a target travel state quantity of the vehicle.

20 Claims, 10 Drawing Sheets

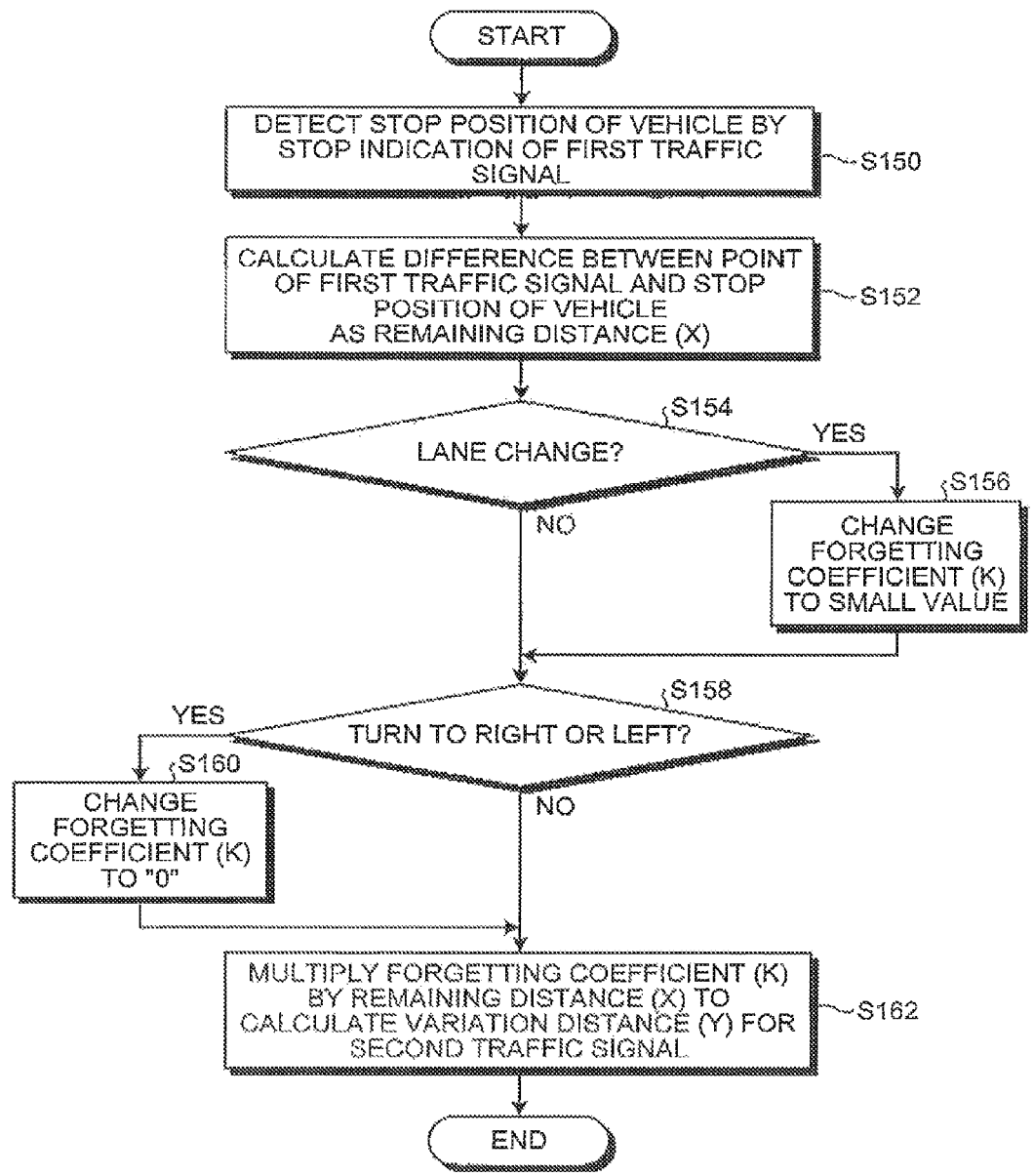

DRIVING SUPPORT APPARATUS

CROSS-REFERENCE TO RELATED APPLICATIONS

This application is a national phase application of International Application No. PCT/JP2011/076208, filed Nov. 14, 2011, the content of which is incorporated herein by reference.

FIELD

The present invention relates to a driving support apparatus.

BACKGROUND

A driving support apparatus mounted on a vehicle to output information for supporting a driver in driving a vehicle is conventionally known. As such conventional driving support apparatus, Patent Literature 1 discloses a device which notifies the driver of a time point at which deceleration should be started when it should stop for a traffic signal based on time for arriving at the traffic signal and time of change in color of light, for example. Patent Literature 2 discloses a device which gives notice of timing to decelerate used on a signal cycle and stop line positional information.

CITATION LIST

Patent Literature

Patent Literature 1: Japanese Patent Application Laid-open No. 2010-244308
Patent Literature 2: Japanese Patent Application Laid-open No, 2010-191625

SUMMARY

Technical Problem

Although the conventional driving support apparatus (Patent Literatures 1 and 2 and the like) gives notice of timing of stopping support such that the vehicle may stop at a position of the traffic signal at an intersection, there actually is a case in which a preceding vehicle is present on a near side of the to signal. In such a case, a position at which the vehicle actually stops is shifted from the position of the traffic signal due to the presence of the preceding vehicle, so that the conventional driving support apparatus has a room for further improvement in terms of more appropriate driving support, for example.

The present invention is achieved in view of the above-described circumstances and an object thereof is to provide a driving support apparatus capable of appropriately supporting driving.

Solution to Problem

In order to achieve the above mentioned object, a driving support apparatus according to the present invention which supports driving of a vehicle, includes a support control device configured to calculate, based on a remaining distance from a stop position at which the vehicle stops by stop indication of a first traffic signal located in a travel direction of the vehicle to a point of the first traffic signal, an estimated variation distance for a second traffic signal located in the travel direction of the vehicle after the first traffic signal, and create a target vehicle travel state obtained by changing timing to start stopping support at the second traffic signal based on the estimated variation distance; and a support device capable of outputting driving support information to support the driving of the vehicle based on a target travel state quantity calculated by the support control device.

Further, in the driving support apparatus, it is preferable that the support control device determines a target stop position at which the vehicle stops by stop indication of the second traffic signal based on a difference between the estimated variation distance and a reference stop position of the second traffic signal, and create the target vehicle travel state based on the target stop position, thereby changing the timing to start the stopping support.

Further, in the driving support apparatus, it is preferable that the support control device corrects a target vehicle speed at the time braking by brake is started for the second traffic signal based on the estimated variation distance, and creates the target vehicle travel state based on the corrected target vehicle speed at the time the braking by brake is started, thereby changing the timing to start the stopping support.

Further, in the driving support apparatus, it is preferable that the support control device multiplies a forgetting coefficient by the remaining distance to calculate the estimated variation distance obtained by correcting the remaining distance.

Further, in the driving support apparatus, it is preferable that the forgetting coefficient is smaller, as an inter-traffic signal distance from the point of the first traffic signal to a point of the second traffic signal is longer.

Further, in the driving support apparatus, it is preferable that the support control device changes correlation between the forgetting coefficient and the inter-traffic signal distance for each traffic signal or period of time.

Further, in the driving support apparatus, it is preferable that the support control device determines a rate of decrease of the forgetting coefficient based on information indicating a change in value of the remaining distance accumulated for each of the traffic signal or the period of time.

Further, in the driving support apparatus, it is preferable that at the time the vehicle makes a lane change, the support control device changes the forgetting coefficient to a value smaller than a value of the forgetting coefficient before the lane change.

Further, in the driving support apparatus, it is preferable that at the time the vehicle turns right or left, the support control device chances the value of the forgetting coefficient to 0.

Further, in the driving support apparatus, it is preferable that the support device outputs the driving support information to support in encouraging recommended driving operation.

Further, in the driving support apparatus, it is preferable that the driving support information includes information to provide instruction to release acceleration request operation and braking request operation.

Further, in the driving support apparatus, it is preferable that the driving support information includes information to provide instruction to start the braking request operation.

Advantageous Effects of Invention

The driving support apparatus according to the present invention has an effect that this can appropriately support driving.

BRIEF DESCRIPTION OF DRAWINGS

FIG. 13 is a flowchart of an example of the control by the ECU.

DESCRIPTION OF EMBODIMENTS

An embodiment according to the present invention is hereinafter described in detail with reference to the drawings. Meanwhile, the present invention is not limited by the embodiment. Components in the following embodiment include a component easily replaced by one skilled in the art or a substantially identical component.

[First Embodiment]

Figure 1:
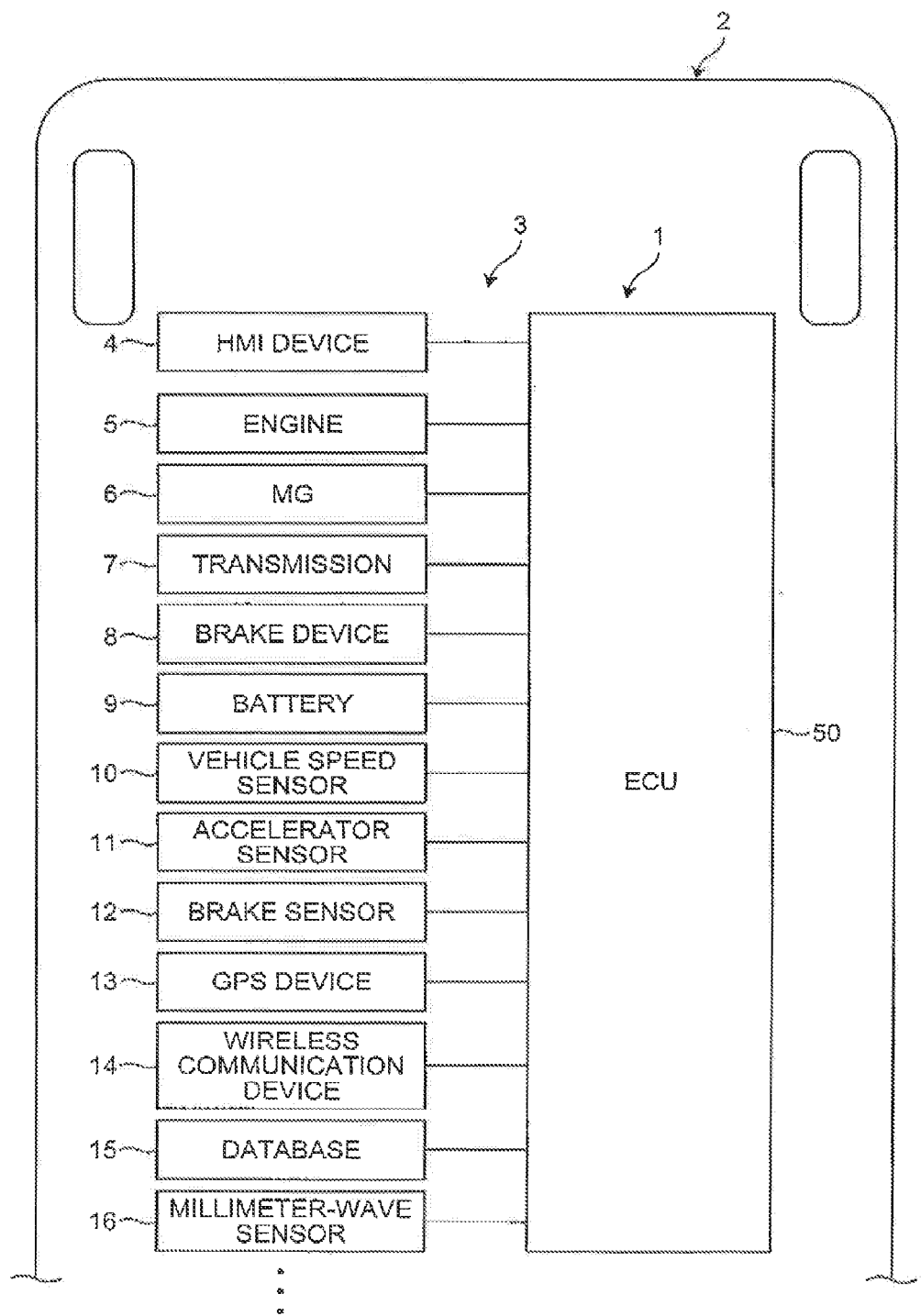
FIG. 1 is a schematic configuration diagram of a vehicle control system.
Figure 2:
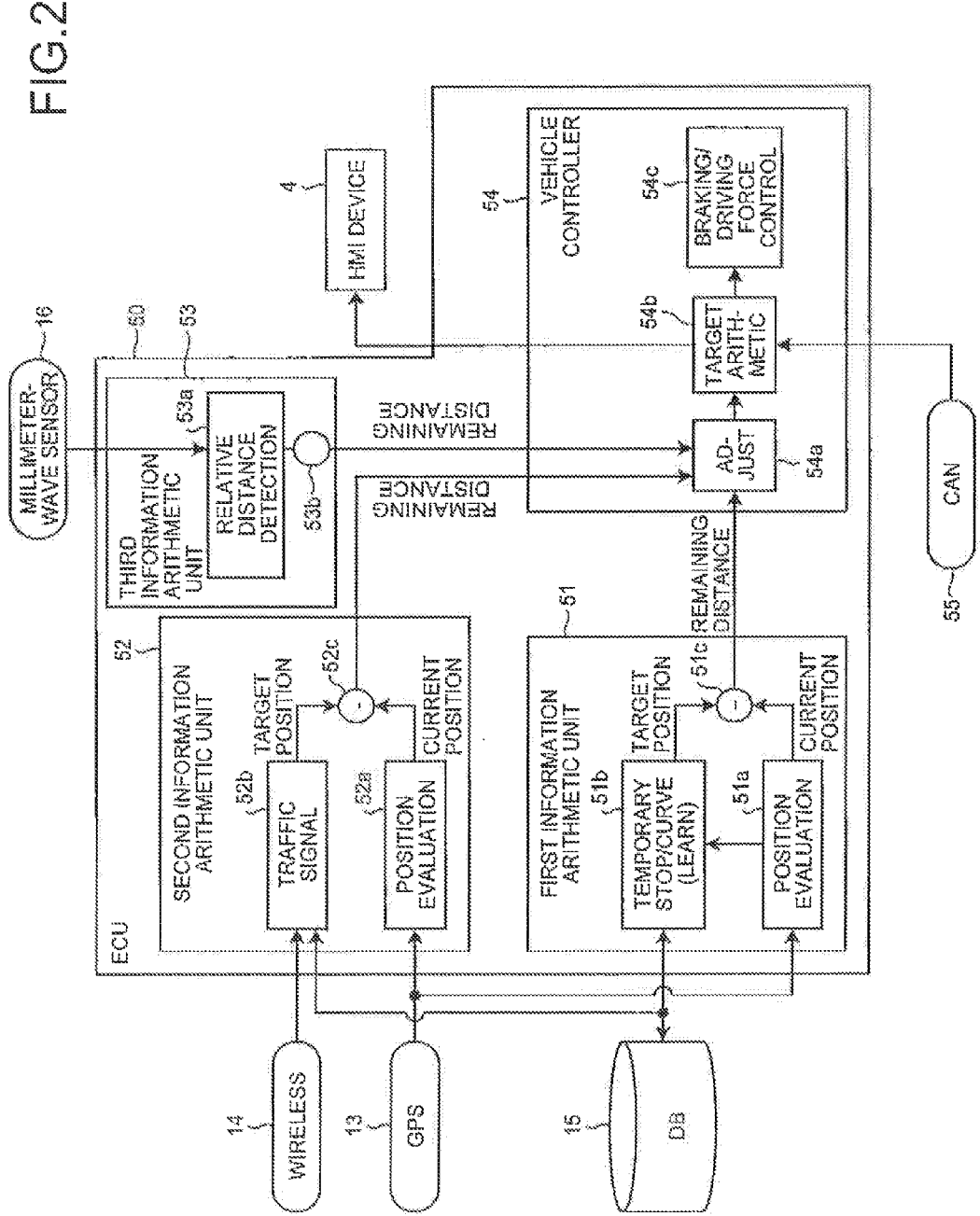
FIG. 2 is a block diagram of an example of a schematic configuration of an ECU.
Figure 3:
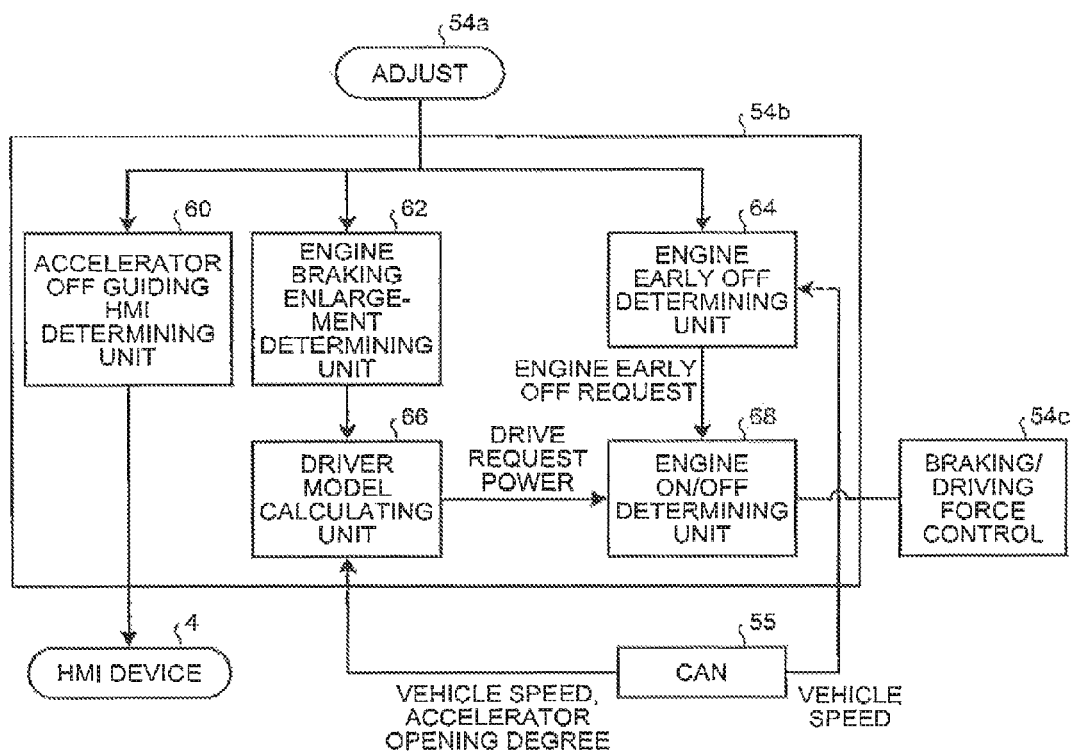
FIG. 3 is a block diagram of an example of a schematic configuration of a target arithmetic unit.

FIG. 1 is a schematic configuration diagram of a vehicle control system according to a first embodiment, FIG. 2 is a block diagram of an example of a schematic configuration of an ECU according to the first embodiment, and FIG. 3 is a block diagram of an example of a schematic configuration of a target arithmetic unit.

A driving support apparatus 1 of this embodiment is applied to a vehicle control system 3 mounted on a vehicle 2 as illustrated in FIG. 1. The driving support apparatus 1 is provided with an HMI (human machine interface) device (hereinafter, sometimes referred to as the "HMI") 4 as a support apparatus and an ECU (electronic control unit) 50. The driving support apparatus 1 is configured to support a driver in driving the vehicle 2 by the ECU 50 controlling the HMI device 4 to output various pieces of driving support information depending on a situation.

The vehicle control system 3 to which the driving support apparatus 1 of this embodiment is applied is a look-ahead information eco-driving support system which utilizes so-called look-ahead information. That is, the vehicle control system 3 supports the driver in eco-driving (eco-drive) by the driving support apparatus 1 supporting in encouraging the driver to drive with a high fuel economy improving effect by utilizing the look-ahead information. According to this, the vehicle control system 3 is the system configured to inhibit fuel consumption to improve fuel economy. The driving support apparatus 1 typically outputs the driving support information to guide/support operation by the driver in order to support the eco-driving by the driver.

The vehicle control system 3 of this embodiment is also a so-called hybrid system which combines an engine 5 and an MG 6 to use as a drive source for travel for rotary drive of a drive wheel of the vehicle 2. That is, the vehicle 2 is a hybrid vehicle provided with the MG 6 in addition to the engine 5 as the drive source for travel. The vehicle 2 is configured to improve the fuel economy by operating the engine 5 as efficiently as possible, compensating excess or deficiency of power and engine braking force by the MG 6 being a rotating electric machine, and further regenerating energy at the time of deceleration.

Meanwhile, although the vehicle control system 3 is described as the hybrid system provided with the engine 5 and the MG 6 as the drive source for travel in the following description, the vehicle control system 3 is not limited to this. The vehicle control system 3 may be the system provided with the engine 5 but not provided with the MG 6 as the drive source for travel or the system provided with the MG 6 but not provided with the engine 5 as the drive source for travel. That is, the vehicle 2 may be a so-called conventional, vehicle or an EV vehicle (electric vehicle).

Specifically, the vehicle control system 3 includes the HMI device 4, the engine 5 as an internal-combustion engine, a motor generator (hereinafter, sometimes referred to as the "MG") 6 as an electric motor, a transmission 7, a brake device 8, a battery 9 and the like. The vehicle control system 3 also includes a vehicle speed sensor 10, an accelerator sensor 11, a brake sensor 12, a GPS (global positioning system) device (hereinafter, sometimes referred to as a "GPS") 13, a wireless communication device 14, a database (hereinafter, sometimes referred to as a "DB") 15, a millimeter-wave sensor 16 and the like.

The HMI device 4 is the support device capable of outputting the driving support information being the information to support the driving of the vehicle 2, and is the device which provides the driving support information to the driver. The HMI device 4, which is an on-vehicle device, includes a display device (visual information display device), a speaker (sound output device) and the like provided in a vehicle interior of the vehicle 2, for example. An existing device such as a display device, a speaker and the like of a navigation system may be used as the HMI device 4. The HMI device 4 provides the information by sound information, visual information (graphic information and character information) and the like to guide driving operation of the driver so as to realize improvement in the fuel economy. The HMI device 4 supports realization of a target value by the driving operation of the driver by providing such information. The HMI device 4 is electrically connected to the ECU 50 to be controlled by the ECU 50. Meanwhile, the HMI device 4 may also include a tactile information output device and the like which output tactile information such as steering wheel vibration, seat vibration, and pedal reaction force, for example.

The vehicle control system 3 is equipped with the engine 5, the MG 6, the transmission 7, the brake device 8, the battery 9 and the like as various actuators which realize travel of the vehicle 2.

The engine 5 exerts driving force on a wheel of the vehicle 2 according to acceleration request operation by the driver, for example, step operation of an accelerator pedal. The engine 5 consumes fuel to generate an engine torque as the engine torque as power for travel to be exerted on the drive wheel of the vehicle 2. The engine 5, in short, is a thermal engine which outputs thermal energy generated by combustion of the fuel as mechanical energy such as the torque, and this includes a gasoline engine, a diesel engine, an LPG engine and the like as an example. The engine 5 is provided with a fuel injection device, an ignition device, a throttle valve device and the like not illustrated, for example, and the devices are electrically connected to the ECU 50 to be controlled by the ECU 50. An output torque of the engine 5 is controlled, by the ECU 50. Meanwhile, the power generated by the engine 5 may also be used in electric power generation by the MG 6.

The MG 6 exerts the driving force on the wheel of the vehicle 2 according to the acceleration request operation by the driver, for example, the step operation of the accelerator pedal. The MG 6 converts electric energy to mechanical power to generate a motor torque as the power for travel to be exerted on the drive wheel of the vehicle 2. The MG 6 is the so-called rotating electric machine provided with a stator being a stator and a rotor being a rotor. The MG 6 is the electric motor which converts the electric energy to the mechanical power to output as well as a power generator which converts the mechanical power to the electric energy to recover. That is, the MG 6 has both a function as the electric motor which is driven by electric power supply and converts the electric energy to the mechanical energy to output (motoring function) and a function as the power generator which converts the mechanical energy to the electric energy (regeneration function). The MG 6 is electrically connected to the ECU 50 though an inverter and the like which convert DC current and AC current to each other to be controlled by the ECU 50. The output torque and a power generation amount of the MG 6 are controlled by the ECU 50 through the inverter.

The transmission 7 is a power transmitting device which changes speed of a rotation output by the engine 5 and the MG 6 to transmit to a side of the drive wheel of the vehicle 2. The transmission 7 may be a so-called manual transmission (MT) or a so-called automatic transmission such as a stepped automatic transmission (AT), a continuously variable transmission (CVT), a multimode manual transmission (MMT), a sequential manual transmission (SMT), and a dual clutch transmission (DCT). Herein, the transmission 7 is described as the continuously variable transmission in which a planetary gear mechanism and the like are used, for example. The transmission 7 is such that a transmission actuator and the like are electrically connected to the ECU 50 to be controlled by the ECU 50.

The brake device 8 exerts braking force on the wheel of the vehicle 2 according to braking request operation by the driver, for example, step operation of a brake pedal. The brake device 8 applies the braking force to the wheel rotatably supported by a vehicle body of the vehicle 2 by generating predetermined frictional force (frictional resistance force) between frictional components such as a brake pad and a brake disk, for example. According to this, the brake device 8 can generate the braking force on a contact area of the wheel of the vehicle 2 with a road surface to put a brake on the vehicle 2. The brake device 8 is such that a brake actuator and the like are electrically connected to the ECU 50 to be controlled by the ECU 50.

The battery 9 is a power storage device capable of storing electric power (bower storage) and discharging the stored electric power. The battery 9 is electrically connected to the ECU 50 to output signals related to various pieces of information to the ECU 50.

When the MG 6 serves as the electric motor, the electric power stored in the battery 9 is supplied thereto through the inverter and the supplied electric power is converted to the power for travel of the vehicle 2 to be output. When the MG 6 serves as the power generator, this is driven by input power to generate the electric power and charges the battery 9 with the generated electric power through the inverter. At that time, the MG 6 can put a brake on rotation of the rotor by rotational resistance generated on the rotor (regenerative braking). As a result, the MG 6 can allow the rotor to generate a motor regenerative torque being a negative motor torque by the regeneration of the electric power at the time of regenerative braking, thereby eventually applying the braking force to the drive wheel of the vehicle 2. That is, in the vehicle control system 3, the mechanical power is input, from the drive wheel of the vehicle 2 to the MG 6 and according to this, the MG 6 generates electric power by the regeneration, so that this can recover motion energy of the vehicle 2 as the electric energy. The vehicle control system 3 can perform the regenerative, braking by the MG 6 by transmitting the mechanical power (negative motor torque) generated on the rotor of the MG 6 according to this to the drive wheel. In this case, in the vehicle control system 3, when a regeneration amount (power generation amount) by the MG 6 is made relatively small, the generated braking force becomes relatively small and deceleration acting on the vehicle 2 is made relatively small. On the other hand, in the vehicle control system 3, when the regeneration amount (power generation amount) by the MG 6 is made relatively large, the generated braking force becomes relatively large and the deceleration acting on the vehicle 2 becomes relatively large.

The vehicle speed sensor 10, the accelerator sensor 11, and the brake sensor 12 are state detecting devices which detect a travel state of the vehicle 2, an input to the vehicle 2 by the driver (driver input), that is, a state quantity and a physical quantity related to actual operation by the driver to the vehicle 2. The vehicle speed sensor 10 detects a vehicle speed of the vehicle 2 (hereinafter, sometimes referred to as a "vehicle speed"). The accelerator sensor 11 detects an accelerator opening degree being an operation amount (step amount) of the accelerator pedal by the driver. The brake sensor 12 detects the operation amount (step amount) of the brake pedal by the driver, for example, a master cylinder pressure and the like. The vehicle speed sensor 10, the accelerator sensor 11, and the brake sensor 12 are electrically connected to the ECU 50 and output detection signals to the ECU 50.

The GPS device 13 is a device which detects a current position of the vehicle 2. The GPS device 13 receives a GPS signal output from a GPS satellite and measures position/calculates GPS information (X coordinate; X, Y coordinate; Y) being positional information of the vehicle 2 based on the received GPS signal. The GPS device 13 is electrically connected to the ECU 50 and outputs a signal related to the GPS information to the ECU 50.

The wireless communication device 14 is a look-ahead information obtaining device which obtains the look-ahead information related to the travel of the vehicle 2 by using wireless communication. The wireless communication device 14 obtains the look-ahead information by using the wireless communication from a device and the like which communicate information by using a communication infrastructure such as the Internet through a road-to-vehicle communication device (roadside device) such as an optical beacon arranged on a roadside, an inter-vehicle communication device mounted on another vehicle, a VICS (registered trademark) (vehicle information and communication system) center and the like, for example. The wireless communication device 14 obtains preceding vehicle information, following vehicle information, traffic signal information, construction work/traffic regulation information, traffic jam information, emergency vehicle information, information related to an accident history database and the like, for example, as the look-ahead information. For example, the traffic signal information includes positional information, signal cycle information such as a lighting cycle of a green light, a yellow light, and a red light and signal changing timing and the like of a traffic signal in front of the vehicle 2 in a travel direction. The wireless communication device 14 is electrically connected to the ECU 50 and outputs a signal related to the look-ahead information to the ECU 50.

The database 15 stores various pieces of information. The database 15 stores map information including road information, various pieces of information and learning information obtained by actual travel of the vehicle 2, the look-ahead information obtained by the wireless communication device 14 and the like. For example, the road information includes road gradient information, road surface condition information, road shape information, limiting vehicle speed information, road curvature (curve) information, temporary stop information, stop line positional information and the like, for example. The information stored in the database 15 is appropriately referred to by the ECU 50 and necessary information is read. Meanwhile, although the database 15 is herein illustrated to be mounted on the vehicle 2, the database 15 is not limited to this and may also be configured to be provided on an information center and the like outside the vehicle 2 to be appropriately referred to by the ECU 50 through the wireless communication and the like for reading of the necessary information. The database 15 of this embodiment accumulates information of a position (actual stop position) at which the vehicle 2 stops at the traffic signal, an intersection and the like at which a reference stop position such as a stop line is arranged as the learning information. The database 15 accumulates the information of the actual stop position for each reference stop position.

The millimeter-wave sensor 16 is a sensor which measures an inter-vehicle distance between the vehicle on which this sensor is mounted and the preceding vehicle (vehicle in front of the vehicle 2). The millimeter-wave sensor 16 emits an electric wave in a millimeter waveband forward from the vehicle 2 and receives the electric wave reflected by a target (preceding vehicle, vehicle in front) to return to this sensor out of the emitted electric wave. The millimeter-wave sensor 16 calculates a distance to the vehicle in front by comparing an output condition of the emitted electric wave and a detection result of the received electric wave. There also is a case in which the millimeter-wave sensor 16 detects a distance to an obstacle in front of the vehicle on which this sensor is mounted. The millimeter-wave sensor 16 transmits information of the calculated distance to the vehicle in front to the ECU 50. Meanwhile, although the millimeter-wave sensor 16 is used as the sensor which measures the inter-vehicle distance between the vehicle on which this sensor is mounted and the preceding vehicle (vehicle in front of the vehicle 2) in this embodiment, various sensors capable of measuring a distance to an object in front of the vehicle 2 may be used. For example, the vehicle 2 may use a laser radar sensor in place of the millimeter-wave sensor 16.

The ECU 50 is a control unit which integrally controls an entire vehicle control system 2 and is formed as an electric circuit of which main body is a well-known microcomputer including a CPU, a ROM, a RAM, and an interface, for example. Results detected by the vehicle speed sensor 10, the accelerator sensor 11, the brake sensor 12, and the millimeter-wave sensor 16, the GPS information obtained by the GPS device 13, the look-ahead information obtained by the wireless communication device 14, the various pieces of information stored in the database 15, electric signals corresponding to a driving signal, a control instruction and the like of each unit are input to the ECU 50. The ECU 50 controls the HMI device 4, the engine 5, the MG 6, the transmission 7, the brake device 8, the battery 9 and the like according to the input electric signals and the like. The ECU 50 executes driving control of the engine 5, driving control of the MG 6, speed changing control of the transmission 7, braking control of the brake device 8 and the like based on the accelerator opening degree, the vehicle speed and the like, for example. The ECU 50 can realize various types of vehicle travel (travel modes) of the vehicle 2 by using the engine 5 and the MG 6 together or selectively using them according to a driving state, for example.

The ECU 50 can detect ON/OFF of accelerator operation being the acceleration request operation to the vehicle 2 by the driver based on the detection result by the accelerator sensor 11, for example. Similarly, the ECU 50 can detect ON/OFF of brake operation being the braking request operation to the vehicle 2 by the driver based on the detection result by the brake sensor 12, for example. Meanwhile, a state in which the accelerator operation by the driver is OFF is a state in which the driver releases the acceleration request operation to the vehicle 2, and a state in which the accelerator operation by the driver is ON is a state in which the driver performs the acceleration request operation to the vehicle 2. Similarly, a state in which the brake operation by the driver is OFF is a state in which the driver releases the braking request operation to the vehicle 2, and a state in which the brake operation by the driver is ON is a state in which the driver performs the braking request operation to the vehicle 2.

The driving support apparatus 1 includes the above-described HMI device 4 and the ECU 50. The driving support apparatus 1 may also include various sensors which detect a vehicle state and various information obtaining units which supply ambient information in addition to the HMI device 4 and the ECU 50. The driving support apparatus 1 supports in encouraging the driver to drive with the high fuel economy improving effect by the ECU 50 controlling the HMI device 4 to output the various pieces of driving support information depending on a situation. The driving support apparatus 1 guides/supports in encouraging the driver to perform recommended driving operation, which is typically driving operation with change, by the HMI device 4 outputting the various pieces of driving support information according to the control by the ECU 50 based on a target travel state quantity of the running vehicle 2. Herein, the target travel state quantity typically is a target travel state quantity of the vehicle 2 at a predetermined point or timing of the running vehicle 2. The driving support apparatus 1 provides driving support such that the travel state quantity of the vehicle 2 reaches the target travel state quantity at the predetermined point or timing by the ECU 50 controlling the HMI device 4 based on the target travel state quantity at the predetermined point or timing and the HMI device 4 outputting the driving support information to support in encouraging the driver to perform the recommended driving operation.

The driving support apparatus 1 of this embodiment changes (moves) the target stop position from the reference stop position (position of the stop line) based on various conditions when allowing the vehicle 2 to stop at the stop position of the traffic signal, the intersection and the like. Specifically, the driving support apparatus 1 calculates an estimated variation distance (also referred to as a variation distance) Y and sets a position moved from the reference stop position to a near side (side of a current position of the vehicle 2) by the calculated estimated variation distance as the target stop position.

The driving support apparatus 1 determines the target travel state quantity being a predetermined travel state at a predetermined position based on the changed target stop position. The driving support apparatus 1 outputs the driving support information based on the target travel state. Meanwhile, the driving support apparatus 1 of this embodiment outputs the driving support information to the HMI, device 4 by the visual information. Herein, the target travel state quantity includes a target brake operation starting vehicle speed being a recommended vehicle speed at which the brake operation (braking request operation) by the driver is recommended as an example. The driving support apparatus 1 guides/supports the driver in performing OFF operation of the accelerator operation (release operation of the acceleration request operation) as an example of the recommended driving operation. The driving support apparatus 1 displays an image of the visual information as the driving support information on a visual information display device such as a center meter, a heed-up display (HUD), superimposing display on a windshield, a liquid crystal display and the like forming the HMI device 4 as an example.

The vehicle 2 outputs information to provide instruction to perform the OFF operation of the accelerator operation as the driving support information and allows the driver to execute the OFF operation of the accelerator operation at a predetermined position, so that the vehicle speed substantially reaches the target brake operation starting vehicle speed at a predetermined point. The vehicle speed of the vehicle 2 substantially reaches the target brake operation starting vehicle speed at a predetermined point and the driver starts the brake operation at a predetermined position at which the target brake operation starting vehicle speed is obtained, so that the vehicle 2 can smoothly stop in the vicinity of the target stop position. In this manner, the driving support information is output such that the vehicle 2 appropriately stops at the target stop position corresponding to the various conditions. According to this, the driving support apparatus 1 realizes appropriate driving support in which a sense of discomfort of the driver is inhibited in the driving support.

An example of the schematic configuration of the ECU 50 is hereinafter described with reference to the block diagram in FIG. 2. The ECU 50 includes a first information arithmetic unit 51, a second information arithmetic unit 52, a third information arithmetic unit 53, and a vehicle controller 54 as illustrated in FIG. 2. The first information arithmetic unit 51, the second information arithmetic unit 52, and the third information arithmetic unit 53 are ITS (intelligent transport systems)—compliant arithmetic units, for example, the arithmetic units for performing infrastructure collaboration and NAVI collaboration. The vehicle controller 54 is a controller which controls each unit of the vehicle 2. The vehicle controller 54 is connected to actuator ECUs which control various actuators such as an engine control ECU, an MG control ECU, a transmission control ECU, a brake control ECU, and, a battery control ECU and sensors through a CAN (control area network) 55 built as an in-vehicle network. The vehicle controller 54 obtains control values of the various actuators and detection values of the sensors as vehicle information through the CAN 55. Meanwhile, the ECU 50 is not limited to this and may also include a NAVI device in place of the first information arithmetic unit 51, for example.

The first information arithmetic unit 51 calculates a remaining distance from the vehicle 2 to a temporary stop or a curve in front of the same in the travel direction based on static infrastructure information, for example, the map information including the road information and the like. The first information arithmetic unit 51 also learns a usual driving act of the driver, estimates the driving act based on this, and learns/predicts deceleration stopping act of the driver. The first information arithmetic unit 51 also calculates a remaining distance from the vehicle 2 to a deceleration stop position in front in the travel direction. Herein, the deceleration stop position obtained by learning the usual driving act of the driver is a position at which the driver often decelerates to stop other than the temporary stop and the like, for example.

Meanwhile, the first information arithmetic unit 51 may learn the deceleration stopping act of the driver, that is, the deceleration stop position corresponding to the driver based on various nieces of information obtained by the actual travel of the vehicle 2. The first information arithmetic unit 51 learns a habit or a tendency of the driving operation from the usual driving of the driver in relation to a person (for example, attribute of the driver), a location (for example, a position in which the operation is performed and the like), a situation (for example, a period of time and the like) and the like based on various pieces of information obtained by the actual travel of the vehicle 2, for example. The first information arithmetic unit 51 learns the temporary stop, the deceleration stop position at which the driver often decelerates to stop and the like by statistically processing ON/OFF and the like of the accelerator operation and the brake operation by the driver, for example. The first information arithmetic unit 51 stores the learned information in the database 15 as the learning information.

The first information arithmetic unit 51 is functionally and conceptually provided with a position evaluating unit 51a, a temporary stop/curve information obtaining unit (hereinafter, sometimes referred to as a "temporary stop/curve information obtaining unit.") 51b, and a subtractor 51c. The position evaluating unit 51a obtains the GPS information through the GPS device 13 to obtain current positional information of the vehicle (the vehicle on which this unit is mounted) 2. The position evaluating unit 51a outputs the current positional information to the temporary stop/curve information obtaining unit 51b and the subtractor 51c. The temporary stop/curve information obtaining unit 51b obtains target positional information indicating the temporary stop, the curve, or the deceleration stop position in front of the vehicle 2 in the travel direction with reference to the map information and the various pieces of information and leaning information obtained by the actual travel of the vehicle 2 stored in the database 15 based on the current positional information input from the position evaluating unit 51a. The temporary stop/curve information obtaining unit 51b outputs the target positional information to the subtractor 51c. The subtractor 51c calculates a difference between the position of the vehicle 2 indicated by the current positional information input from the position evaluating unit 51a and the temporary stop, the curve, or the deceleration stop position indicated by the target positional information input from the temporary stop/curve information obtaining unit 51b and calculates the remaining distance to the temporary stop, the curve, or the deceleration stop position. The subtractor 51c outputs remaining distance information indicating the remaining distance to an adjusting unit 54a of the vehicle controller 54.

The first information arithmetic unit 51 determines whether the estimated variation distance Y is set for the temporary stop and deceleration stop position of a target by the temporary stop/curve information obtaining unit 51b. When the first information arithmetic unit 51 determines that the estimated variation distance Y is set for the temporary stop and deceleration stop position of the target by the temporary stop/curve information obtaining unit 51*b*, this moves the target positional information indicating the target stop position to a near side of the reference stop position (position of the stop line of the temporary stop and deceleration stop position of the target) based on a value of the estimated variation distance Y. The first information arithmetic unit 51 calculates the remaining distance based on the changed target stop position. Meanwhile, information of the estimated variation distance Y can be stored in the database 15. A method of setting the estimated variation distance Y is to be described later.

The second information arithmetic unit 52 calculates a remaining distance from the vehicle 2 to the stop position on a red light in front in the travel direction based on dynamic infrastructure information, for example, the traffic signal information and the like.

The second information arithmetic unit 52 is functionally and conceptually provided with a position evaluating unit 52*a*, a traffic signal information obtaining unit 52*b*, and a subtractor 52*c*. The position evaluating unit 52*a* obtains the GPS information through the GPS device 13 to obtain the current positional information of the vehicle (the vehicle on which this unit is mounted) 2. The position evaluating unit 52*a* outputs the current positional information to the subtractor 52*c*. The traffic signal information obtaining unit 52*b* obtains the traffic signal information through the wireless communication device 14 and obtains the target positional information indicating the stop position on the red light in front of the vehicle 2 in the travel direction based on the traffic signal information. The traffic signal information obtaining unit 52*b* outputs the target positional information to the subtractor 52*c*. The subtractor 52*c* calculates a difference between the position of the vehicle 2 indicated by the current positional information input from the position evaluating unit 52*a* and the stop position on the red light indicated by the target positional information input from the traffic signal information obtaining unit 52*b* and calculates the remaining distance to the stop position on the red light. The subtractor 52*c* outputs remaining distance information indicating the remaining distance to the adjusting unit 54*a* of the vehicle controller 54.

The second information arithmetic unit 52 determines whether the estimated variation distance Y is set for the stop position on the red light of the target (position of the stop line corresponding to the traffic signal) by the traffic signal information obtaining unit 52*b*. When the second information arithmetic unit 52 determines that the estimated variation distance Y is set for the stop position on the red light of the target by the traffic signal information obtaining unit 52*b*, this moves the target positional information indicating the target stop position to a near side of the reference stop position (position of the stop line corresponding to the traffic signal) based on the value of the estimated variation distance Y. The second information arithmetic unit 52 calculates the remaining distance based on the changed target stop position. Meanwhile, information of the estimated variation distance Y can be stored in the database 15. A method of setting the estimated variation distance Y is to be described later.

The third information arithmetic unit 53 is functionally and conceptually provided with a relative distance detecting unit 53*a* and a converting unit 53*b*. The relative distance detecting unit 53*a* obtains the detection result of the millimeter-wave sensor 16. The relative distance detecting unit 53*a* detects whether there is the preceding vehicle from the detection result of the millimeter-wave sensor 16, and when there is the preceding vehicle, this detects a relative distance to the preceding vehicle. The converting unit 53*b* creates information to adjust the remaining distance from information of the relative distance to the preceding vehicle calculated by the relative distance detecting unit 53*a*. Specifically, the converting unit 53*b* creates adjusting information of the remaining distance including an instruction to further shorten the remaining distance when the relative distance to the preceding vehicle is shorter than a set distance. The converting unit 53*b* creates the adjusting information of the remaining distance including an instruction to keep the remaining distance unchanged when the relative distance to the preceding vehicle is not shorter than the set distance. That is, the converting unit 53*b* creates the adjusting information of the remaining distance to provide instruction to keep the remaining distance unchanged or shorten the same based on the relative distance to the preceding vehicle. Meanwhile, the converting unit 53*b* may also directly output the relative distance to the preceding vehicle to the vehicle controller 54.

The vehicle controller 54 is configured to integrally control the HMI device 4 and the braking/driving force of the vehicle 2 based on the remaining distance to the temporary stop, the curve, or the deceleration stop position calculated by the first information arithmetic unit 51, the remaining distance to the stop position on the red light calculated by the second information arithmetic unit 52, the information based on relationship with the preceding vehicle calculated by the third information arithmetic unit 53, a vehicle speed Vx of the vehicle 2, ON/OFF of the accelerator operation, ON/OFF of the brake operation, the accelerator opening degree and the like.

The vehicle controller 54 is functionally and conceptually provided with the adjusting unit 54*a*, a target arithmetic unit 54*b*, and a braking/driving force controller 54*c*. The adjusting unit 54*a* is configured to adjust the remaining distance information to the temporary stop, the curve, or the deceleration stop position input from the subtractor 51*c*, the remaining distance information to the stop position on the red light input from the subtractor 52*c*, and the adjusting information of the remaining distance based on the relationship with the preceding vehicle input from the converting unit 53*b*. The adjusting unit 54*a* adjusts the remaining distance information based on accuracy of the remaining distance information, a length relationship of the remaining distances and the like, for example, and outputs an adjustment result to the target arithmetic unit 54*b*. Herein, when the adjusting unit 54*a* provides a stopping support, this basically adjusts the remaining distance information input from the subtractor 51*c* and the remaining distance information input from the subtractor 52*c* to determine a target of the stopping support. That is, the adjusting unit 54*a* determines whether to stop at the stop position of the temporary stop such as the intersection without the traffic signal or to stop at the stop position of the traffic signal because the traffic signal is at red to determine the remaining distance. Further, the adjusting unit 54*a* creates the remaining distance information to be output to the target arithmetic unit 54*b* by adjusting the determined remaining distance based on the adjustment information of the remaining distance based on the relationship with the preceding vehicle input from the converting unit 53*b*.

The target arithmetic unit 54*b* calculates the target travel state quantity based on the adjustment result of the remaining distance information input from the adjusting unit 54*a*, the vehicle speed Vx of the vehicle 2 input from the vehicle speed sensor 10 through the CAN 55 and the like. The target arithmetic unit 54*b* is configured to control the HMI device 4 and the braking/driving force controller 54*c* based on the target travel state quantity.

An example of a schematic configuration of the target arithmetic unit 54b is described with reference to a block diagram in .FIG. 3. The target arithmetic unit 54b includes an accelerator OFF guiding HMI determining unit 60, an engine braking enlargement determining unit 62, an engine early OFF determining unit 64, a driver model calculating unit 66, and an engine ON/OFF determining unit 68 as illustrated in FIG. 3. The accelerator OFF guiding HMI determining unit 60 calculates timing to guide/support the OFF operation of the accelerator operation by the HMI device 4 based on the target travel state quantity and controls the HMI device 4 according to this to output the driving support information.

The engine braking enlargement determining unit 62 calculates magnitude of engine braking to be generated based on the target travel state quantity. That is, the engine braking enlargement determining unit 62 calculates the magnitude of the engine braking required to decelerate to a speed at which the brake operation is turned ON at a predetermined point after the OFF operation of the accelerator operation is generated, based on the target travel state quantity. The engine braking enlargement determining unit 62 calculates the number of times and a time interval of engine braking regeneration by the MG 6 in addition to normal engine braking and the like based on the calculated magnitude of the engine braking. The engine braking enlargement determining unit 62 sends a calculation result to the driver model calculating unit 66.

The engine early OFF determining unit 64 calculates timing to turn OFF an output of the engine 5 based on the target travel state quantity. That is the engine early OFF determining unit 64 determines whether it becomes a state in which the output of the engine 5 is turned OFF, that is, the engine braking is generated for decelerating to the speed at which the brake operation is turned ON at the predetermined point after the OFF operation of the accelerator operation is generated, based on the target travel state quantity. When the engine early OFF determining unit 64 determines that it is necessary to turn OFF the engine 5, this outputs an engine early OFF request to the engine ON/OFF determining unit 68 at calculated timing.

The driver model calculating unit. 66 calculates driver request power based on the vehicle speed and the accelerator opening degree obtained through the CAN 55 and the calculation result output from the engine braking enlargement determining unit 62. The driver model calculating unit 66 calculates a target driving state based on the calculation result of the engine braking enlargement determining unit 62 and detects an actual driving state through the CAN 55. The driver model calculating unit 66 outputs information of the output of the engine 5 calculated based on a difference between the target driving state and the actual driving state to the engine ON/OFF determining unit 68 as the driver request power. Herein, the driver model calculating unit 66 may also output a necessary condition for realizing the target driving state as the driver request power or output a necessary condition for approaching the driving state based on the accelerator opening degree as the driver request power.

The engine ON/OFF determining unit 68 determines a driving state of the engine 5 based on the engine early OFF request output from the engine early OFF determining unit 64 and the driver request power. The engine ON/OFF determining unit 68 determines whether to turn ON or OFF the engine 5, that is, whether to generate the engine braking by the engine 5 based on a determination result. The engine ON/OFF determining unit 68 outputs the determination result to the braking/driving force controller 54c.

The braking/driving force controller 54o performs braking/driving force control when the OFF operation of the accelerator operation of the driver is actually performed and adjusts such that actual deceleration of the vehicle 2 reaches prescribed accelerator OFF deceleration. Specifically, the braking/driving force controller 54c controls ON/OFF of the engine 5 based on the control of the target arithmetic unit 54b to control the deceleration generated by the engine braking. Since the vehicle control system 3 is the hybrid system, the braking/driving force controller 54c executes regenerative engine braking enlarging control to perform the engine braking regeneration by the MG 6 in addition to the normal engine braking and the like such that the deceleration reaches the prescribed accelerator OFF deceleration. In the engine braking regeneration by the regenerative engine braking enlarging control, an effect of heat generation amount and the like at the time of regeneration is smaller than that in brake regeneration according to the above-described ON operation of the brake operation of the driver, so that regeneration efficiency tends to be relatively high. Therefore, the vehicle control system 3 can secure a relatively long period during which the regenerative engine braking enlarging control is executed by guiding/supporting the OFF operation of the accelerator operation of the driver at appropriate timing by the driving support apparatus 1, so that a higher fuel economy improving effect can be expected.

Figure 4:
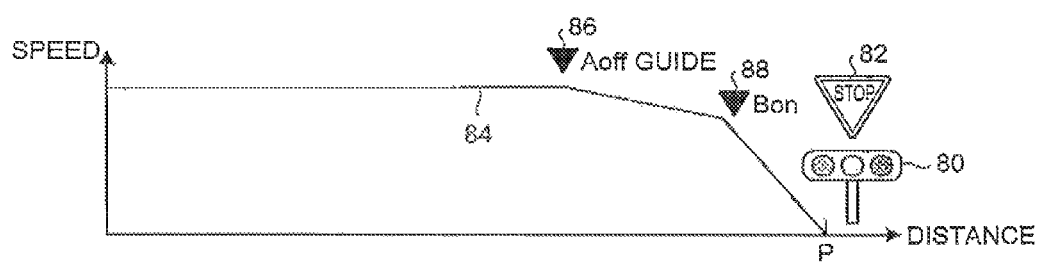
FIG. 4 is a schematic diagram of a relationship between a remaining distance to a stop position and a vehicle speed.
Figure 5:
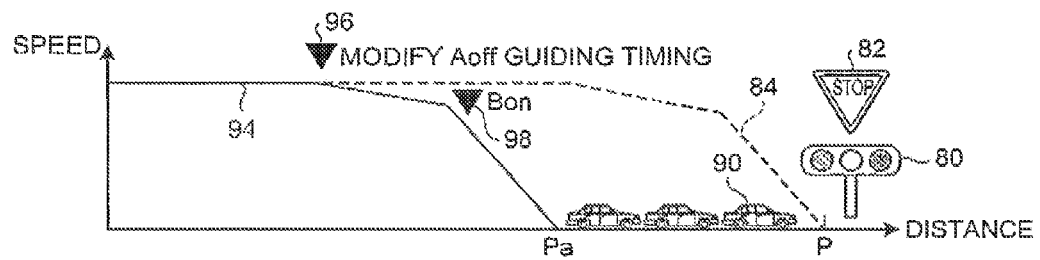
FIG. 5 is a schematic diagram of a relationship between the remaining distance to the stop position and the vehicle speed.

Next, an example of a process of the driving support apparatus 1 of this embodiment is described with reference to FIGS. 4 to 7. FIGS. 4 and 5 are schematic diagrams of relationships between the remaining distance to the stop position and the vehicle speed. When the driving support apparatus 1 detects arrival at a point at which there is a traffic signal 80 at red or a temporary stop 82 as illustrated in FIG. 4, this provides the stopping support by setting a point P at which the stop line corresponding to the traffic signal 80 and the sign 82 is arranged as the target stop position. Specifically, the driving support apparatus 1 calculates a deceleration pattern with which it is possible to stop at the point P as represented as a deceleration pattern 84 in FIG. 4 and determines an accelerator OFF guiding point 86 and a brake ON guiding point 88 for realizing the deceleration pattern 84. The accelerator OFF guiding point 86 is timing to display an image to guide the driver to turn OFF the accelerator. The brake ON guiding point 88 is timing to display an image to guide the driver to turn ON the brake, that is, to execute the brake operation. The driving support apparatus 1 calculates timing capable of realizing various objects such as appropriate stop at the target stop position, realization of braking by brake with appropriate deceleration and braking distance, and generation of electric power by the engine braking regeneration at a high level as the accelerator OFF guiding point 86. The driving support apparatus 1 may calculate the deceleration pattern 84, the accelerator OFF guiding point 86, and the brake ON guiding point 88 as the target travel state quantities or may calculate the accelerator OFF guiding point 86 and the brake ON guiding point 88 as the target travel state quantities.

When the driving support apparatus 1 determines that a current position and a current vehicle speed correspond to the calculated accelerator OFF guiding point 86 and brake ON guiding point 88, this displays the image corresponding to the operation on the HMI device 4. As the accelerator OFF guiding point 86 and the brake ON guiding point 88 of the driving support apparatus 1, time points predetermined time before desired operation starting points may be made the accelerator OFF guiding point 86 and the brake ON guiding point 88 in consideration of time from the display of the image to the execution of the operation. In this manner, the driving support apparatus 1 can support stop operation to decelerate the vehicle 2 with a pattern based on the deceleration pattern 84, appropriately stop at the target stop point, realize the braking by brake with the appropriate deceleration and braking distance, and generate the electric power by the engine braking regeneration by outputting the driving support information based on the target travel state quantities such as the calculated deceleration pattern 84, accelerator OFF guiding point 86, and brake ON guiding point 88.

The driving support apparatus 1 may set the stop line as the target stop position, calculate the target travel state quantity for stopping at the target stop position, and output the driving support information based on the target travel state quantity when there is no other vehicle between the vehicle on which this is mounted and the point P at which the stop line is arranged as illustrated in FIG. 4, this can stop at the stop line while realizing a preferable deceleration pattern. However, when other vehicles stop such that a first vehicle is at the point P of the stop line as illustrated in FIG. 5, an actual stop position is a point Pa. In a case illustrated in FIG. 5, if the driving support apparatus 1 provides the stopping support by setting the point P of the stop line as the target stop position, the preferable deceleration pattern cannot be realized. The driver should finally decelerate with high deceleration even if this turns the accelerator OFF according to the support when the stopping support based on the deceleration pattern 84 is executed.

In contrast, the driving support apparatus 1 calculates the estimated variation distance Y for each stop position and moves the target stop position to a near side of the actual stop position based on the calculated estimated variation distance Y, thereby setting the point Pa as the target stop position. The driving support apparatus 1 can calculate a deceleration pattern 94, an accelerator OFF guiding point 96, and a brake ON guiding point 98 with which it is possible to preferably stop at the point Pa by setting the point Pa as the target stop position. Meanwhile, as described later, since a current actual stop position is not calculated by using an actually measured value by the sensor and the like, there is a case in which the target stop position is different from the point Pa; however, the estimated variation distance Y can make the target stop position closer to the point Pa than in a case in which the point P is maintained as the target stop position.

Figure 6:
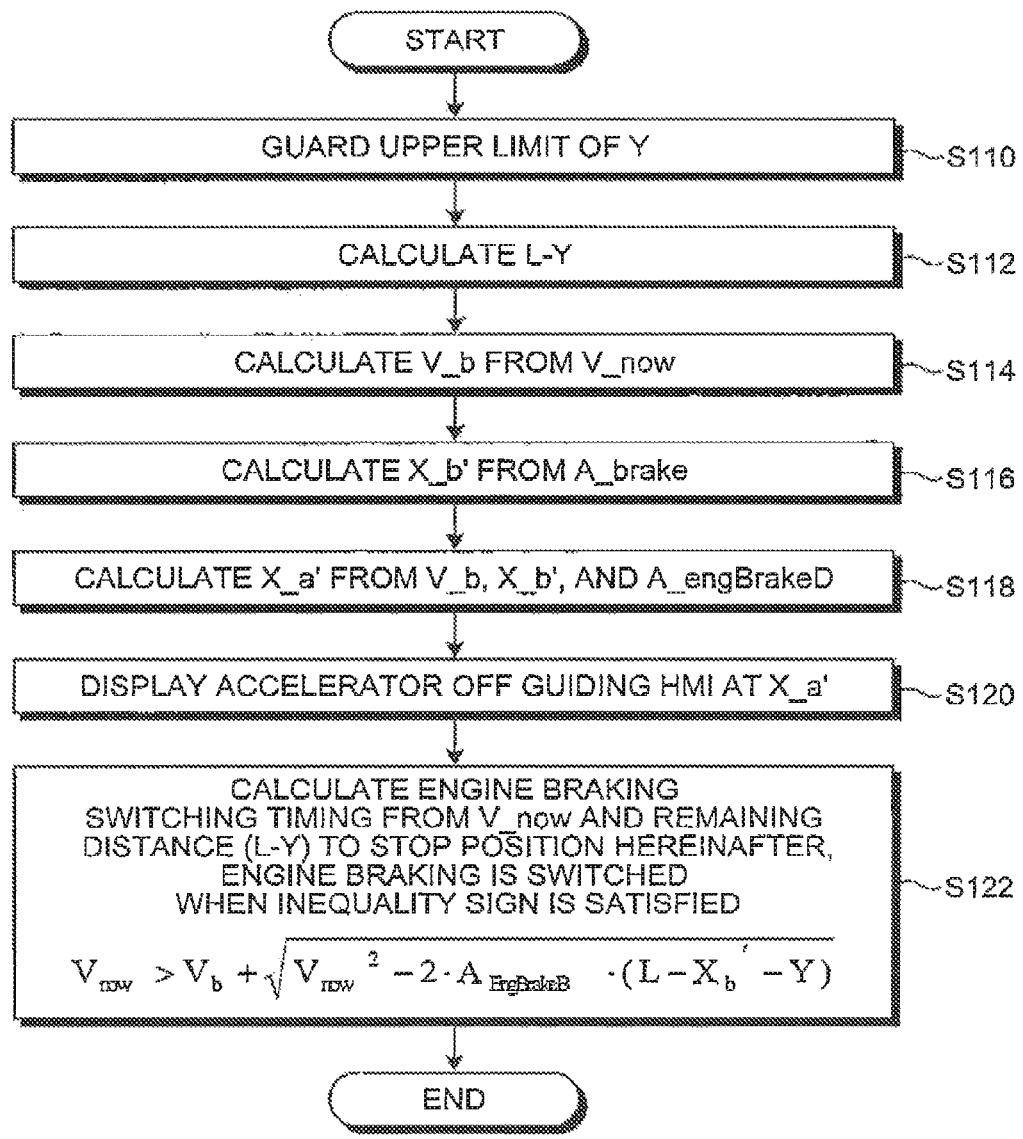
FIG. 6 is a flowchart of an example of control by the ECU.
Figure 7:
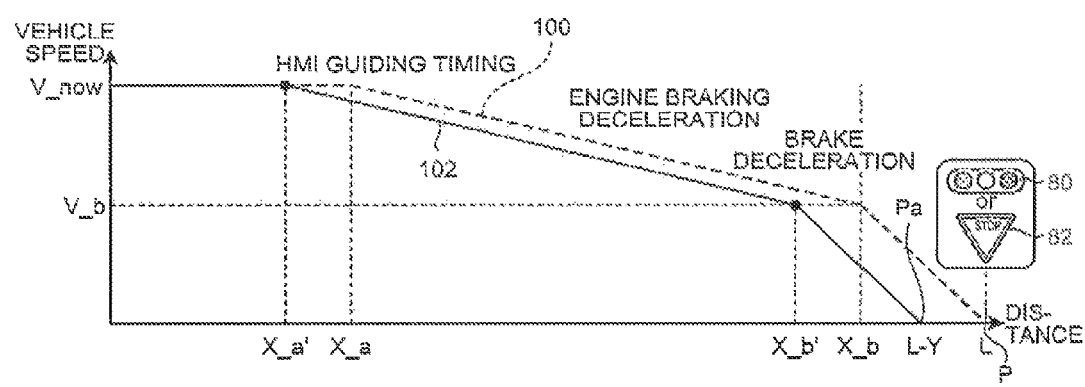
FIG. 7 is a schematic diagram of an example of a relationship between the remaining distance to the stop position and the vehicle speed and a support mode in the vehicle control system.

The stopping support by using the estimated variation distance is hereinafter described with reference to FIGS. 6 and 7. FIG. 6 is a flowchart of an example of the control by the ECU. FIG. 7 is a schematic diagram of an example of a relationship between the remaining distance to the stop position and the vehicle speed and a support mode in the vehicle control system. As illustrated in FIGS. 6 and 7, the target arithmetic unit 54b first guards an upper limit of the estimated variation distance Y at step S110. That is, when the target arithmetic unit 54b reads the estimated variation distance Y for the reference stop position, this determines whether the read estimated variation distance Y exceeds an upper limit, and when this exceeds the upper limit, the estimated variation distance Y is set to the upper limit. In this manner, this guards the upper limit of the estimated variation distance Y, thereby making the estimated variation distance Y shorter than a distance between the reference stop position to X_b. Herein, X_b is a position of the brake ON guiding point when the reference stop position is set as the target stop position.

When the target arithmetic unit 54b guards the upper limit at step S110, this calculates L−Y at step S112. Herein, a distance L is a distance from a current point, to the point P being the reference stop position. According to this, the target arithmetic unit 54b sets a position of L−Y, that is, a position on a near side of the reference stop position with the variation distance Y as the target stop point.

When the target arithmetic unit 54b calculates L-Y at step S112, this calculates a target brake operation vehicle speed V_b based on a current vehicle speed (approaching vehicle speed) V_now of the vehicle 2 at step S114. The target arithmetic unit 54b multiples a predetermined vehicle speed coefficient by the vehicle speed V_now to calculate the target brake operation starting vehicle speed V_b. The vehicle speed coefficient is set such that the target brake operation starting vehicle speed V_b becomes a speed at which it is possible to arrive at the stop position without giving the driver of the vehicle 2 and the driver of a following vehicle a sense of sudden braking or stress caused by a too slow vehicle speed of the vehicle 2 when the ON operation of the brake operation is performed.

Next, when the target arithmetic unit 54b sets the target brake operation starting vehicle speed V_b at step S114, this calculates a tartlet brake operation starting position X_b' as a predetermined point based on target brake deceleration A_brake set in advance at step S116. The target arithmetic unit 54b calculates the target brake operation starting position X_b' based on the target brake operation starting vehicle speed V_b and the target brake deceleration A_brake by setting the target stop position corresponding to the remaining distance adjusted by the adjusting unit 54a (point with the distance L−Y from the current point) as a reference position. That is, the target arithmetic unit 54b inversely calculates a brake operation starting position from where the vehicle 2 running at the target brake operation starting vehicle speed V_b may decelerate with the target brake deceleration A_brake by the brake operation to stop at the target stop position and sets the same as the target brake operation starting position X_b'.

The target brake deceleration A_brake is set as a fixed value in advance according to the deceleration which does not give the driver the sense of sudden braking and the sense of discomfort when the driver performs the ON operation of the brake operation, for example. Further, since the vehicle control system 3 is herein the hybrid system, the target brake deceleration A_brake is more preferably set to the deceleration obtained by adding a slight margin to regenerative upper limit deceleration with which the regeneration can be efficiently performed by the MG 6. Moreover, the target brake deceleration A_brake is preferably set according to the deceleration capable of satisfying the deceleration required by the driver according to the brake operation by the regenerative braking by the MG 6. In this case, the vehicle control system 3 being the hybrid, system can stop the vehicle 2 at the stop position not by frictional braking by the brake device 8 but by the regenerative braking by the MG 6 when the deceleration requested according to the brake operation of the driver is not larger than the target brake deceleration. In this case, the vehicle control system 3 can efficiently recover the motion energy of the vehicle 2 as the electric energy by the brake regeneration according to the brake operation of the driver without consuming the same as the thermal energy by the frictional braking, so that the high fuel economy improving effect can be expected.

When the target arithmetic unit 54b determines the target brake operation starting position X_b' at step S116, this calculates an accelerator OFF guiding position X_a' based oft the target brake operation starting vehicle speed V_b, the target brake operation starting position X_b', and prescribed accelerator OFF deceleration A_engBrake set in advance at step S118.

The accelerator OFF deceleration A_engBrake is the deceleration of the vehicle 2 in a state in which the accelerator operation and the brake operation are turned OFF. Accelerator OFF deceleration A_engBrakeD is set as a fixed value in advance based on an engine braking torque by rotational resistance of the engine 5, a TM braking torque by rotational resistance of the transmission 7, and further a motor regenerative torque corresponding to the regeneration amount by the MG 6 in the hybrid system as in this embodiment, for example.

The target arithmetic unit 54b calculates the accelerator OFF guiding position X_a' based on the accelerator OFF deceleration A_engBrakeD and the target brake operation starting vehicle speed V_b by setting the target brake operation starting position X_b' as a reference position. That is, the target arithmetic unit 54b inversely calculates the OFF position of the accelerator operation from where the vehicle 2 can decelerate with the accelerator OFF deceleration A_engBrakeD to make the vehicle speed of the vehicle 2 the target brake operation starting vehicle speed V_b at the target brake operation starting position X_b' and sets the same as the accelerator OFF guiding position X_a'.

When the target arithmetic unit 54b calculates the accelerator OFF guiding position X_a' at step S118, this starts an outputting process of the driving support information by using the HMI device 4. The target arithmetic unit 54b outputs the driving support information related to accelerator OFF guiding support to the HMI device 4 at timing at which the vehicle 2 arrives at the accelerator OFF guiding position X_a' at the current vehicle speed at step S120. Then, the HMI device 4 displays HMI related to the accelerator OFF guiding support as the driving support information.

When the OFF operation of the accelerator operation of the driver is actually performed, the braking/driving force controller 54c performs braking/driving force control to adjust such that the actual deceleration of the vehicle 2 reaches prescribed accelerator OFF D range deceleration A_engBrakeB. During this, the braking driving force controller 54c executes the regenerative engine braking enlarging control to perform the engine braking regeneration by the MG 6 in addition to the normal engine braking and the like. Timing and the like to execute the regenerative engine braking enlarging control can be calculated based on the calculation result of the engine braking enlargement determining unit 62.

Then, the braking/driving force controller 54c of this embodiment calculates timing to switch the engine braking, that is, timing to switch the acceleration OFF deceleration based on the current vehicle speed V_now of the vehicle 2 and the remaining distance (L−Y) from the current position to the stop position at step S122. The braking/driving force controller 54c switches the engine braking at timing at which an inequality sign in following (Equation 1) is satisfied, for example. That is, the braking/driving force controller 54c switches the accelerator OFF deceleration from the accelerator OFF D range deceleration A_engBrakeD to accelerator OFF B range deceleration A_engBrakeB. Then, the braking/driving force controller 54c adjusts such that the actual deceleration of the vehicle 2 reaches the accelerator OFF B range deceleration A_EngBrakeB and finishes a current control period to shift to a next control period, $$V_{now} > V_b + \sqrt{V_{now}^2 - 2 \cdot A_{EngBrakeB} \cdot (L - X_b' - Y)} \quad (1)$$

in Equation (1) described above, [V_now] represents the current vehicle speed of the vehicle 2 at which the driver performs the OFF operation of the accelerator operation. [V_b] represents the target brake operation starting vehicle speed, [A_EnqBrakeB] represents the accelerator OFF B range deceleration. [L] represents the remaining distance from the current position to the reference stop position at timing at which the OFF operation of the accelerator operation of the driver is actually performed. [Y] represents the estimated variation distance. That is, [L−Y] represents the remaining distance from the current position to the target stop position. [X_b'] represents the target brake operation starting position.

The driving support apparatus 1 configured in the above-described manner can guide/support the timing of the OFF operation of the accelerator operation of the driver such that the vehicle speed reaches the target brake operation starting vehicle speed V_b when the vehicle 2 arrives at the target brake operation starting position X_b' by performing accelerator OFF guiding display at the point X_a'. As a result, the driving support apparatus 1 can appropriately guide such that the deceleration requested according to the brake operation reaches optimal target brake deceleration A_brake when the driver actually performs the brake operation for stopping at the target stop position, so that the high fuel economy improving effect can be realized.

The driving support apparatus 1 configured in the above-described manner calculates the estimated variation distance Y and provides the stopping support by using a deceleration pattern 102 obtained by moving the target stop position on a near side based on the estimated variation distance Y as illustrated in .FIG. 7, so that it becomes possible to stop with an appropriate deceleration pattern on a nearer side than in a case of a deceleration pattern 100 in which the stop position is the point P with the distance L from the current position while using the same target brake deceleration and engine braking deceleration as those of the deceleration pattern 100.

The driving support apparatus 1 can calculate the target travel state quantity in consideration of the estimated variation distance based on a reference target position (distance L) point at which there are the stop line and the like, thereby correcting based on the reference target position.

The driving support apparatus 1 according to the embodiment described above can support the driver in driving the vehicle 2 in a comprehensive manner at appropriate timing, so that appropriate driving support can be provided and it is possible to appropriately support the driver in the eco-driving (eco-drive), thereby inhibiting the fuel consumption to improve the fuel economy, for example.

Meanwhile, although the driving support apparatus 1 is described above supposing that the vehicle 2 is the hybrid vehicle, the vehicle 2 is not limited to this and appropriate driving support is also possible with the conventional vehicle or the EV vehicle.

Figure 8:
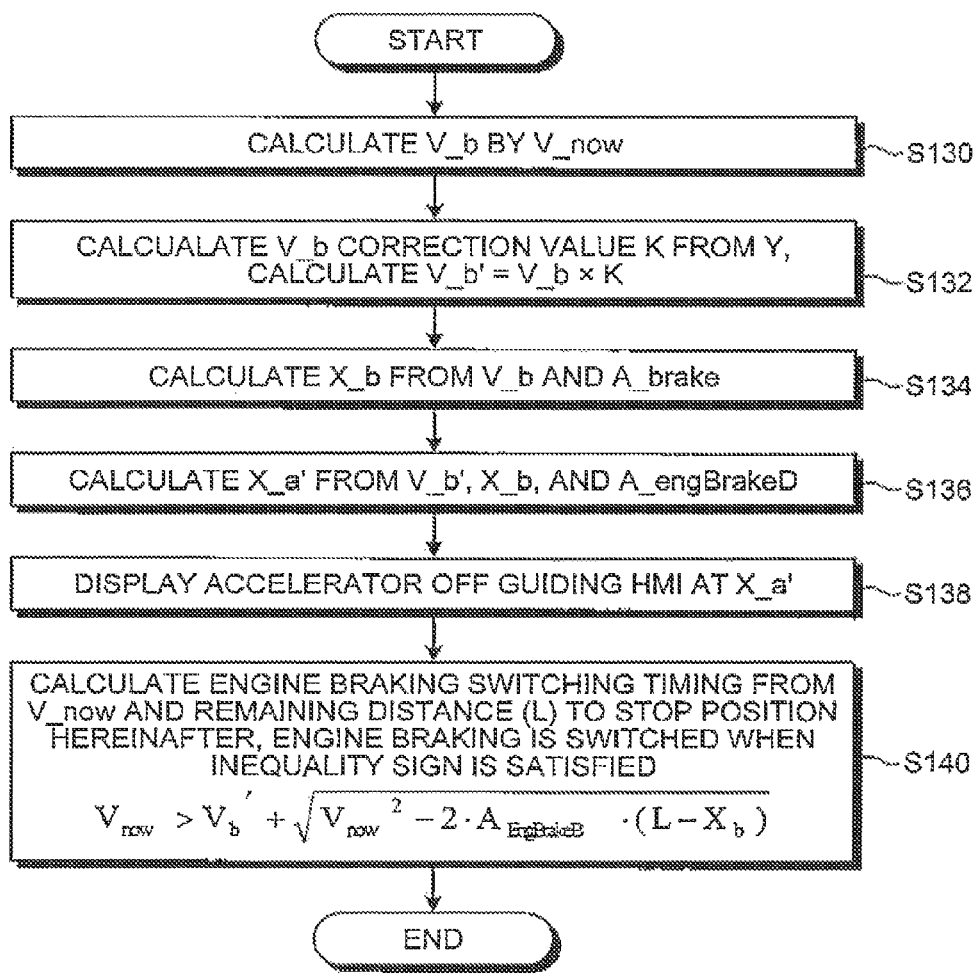
FIG. 8 is a flowchart of another example of the control by the ECO.
Figure 9:
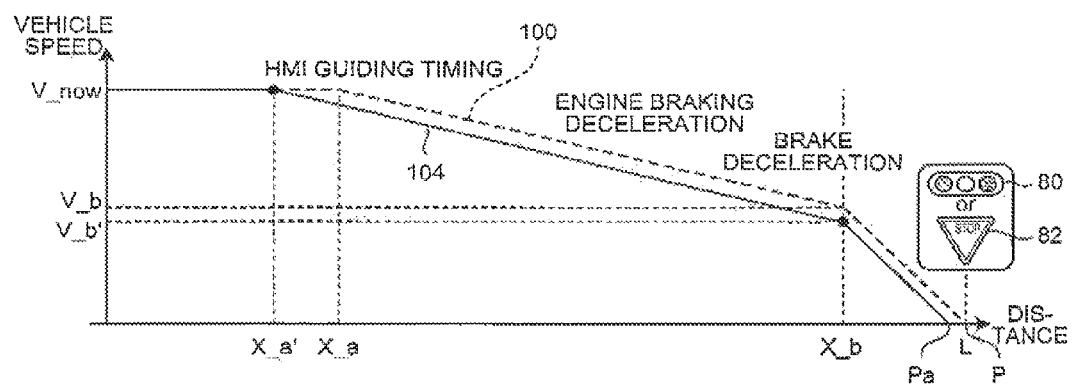
FIG. 9 is a schematic diagram of another example of the relationship between the remaining distance to the stop position and the vehicle speed and the support mode in the vehicle control system.
Figure 10:
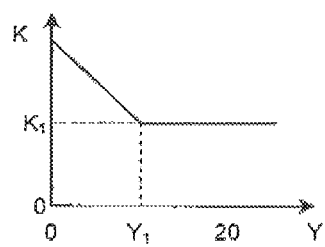
FIG. 10 is a graph of an example of a relationship between a distance Y and a coefficient K.

Herein, the method of changing the deceleration pattern by using the estimated variation distance Y is not limited to the example in FIGS. 6 and 7. Another example of the stopping support by using the estimated variation distance is hereinafter described with reference to FIGS. 8 to 10. FIG. 8 is a flowchart of another example of the control by the ECU. FIG. 9 is a schematic diagram of an example of the relationship between the remaining distance to the stop position and the vehicle speed and the support mode in the vehicle control system. FIG. 10 is a graph of an example of a relationship between the distance Y and a coefficient K.

As illustrated in FIGS. 8 and 9, the target arithmetic unit 54b first calculates the target brake operation vehicle speed V_b based on the current vehicle speed (approaching vehicle speed) V_now of the vehicle 2 at step S130. The target arithmetic unit 54b multiples a predetermined vehicle speed coefficient by the vehicle speed V_now to calculate the target brake operation starting vehicle speed V_b. The target brake operation starting vehicle speed V_b can be calculated in the manner similar to that in the above-described embodiment.

Next, when the target arithmetic unit 54*b* sets the target brake operation starting vehicle speed V_b at step S130, this calculates a V_b correction value K by the estimated variation distance Y and calculates a target brake operation starting vehicle speed corrected value V_B'=V_b×K at step S132. Herein, the V_b correction value K is a coefficient set in advance for the estimated variation distance Y as illustrated in FIG. 10. A relationship between the V_b correction value K and the estimated variation distance Y is such that the V_b correction value K and the estimated variation distance Y increase in a proportional relationship until the estimated variation distance Y reaches a predetermined value Y1 and the V_b correction value K remains a constant value K1 after the estimated variation distance Y exceeds the predetermined value Y1. K is a value smaller than 1 and the target brake operation starting vehicle speed corrected value V_b' is a value lower than the target brake operation starting vehicle speed V_b.

When the target arithmetic unit 54*b* calculates the target brake operation starting vehicle speed corrected value V_b' at step S132, this calculates a target brake operation starting position X_b as a predetermined point based on the target brake operation starting vehicle speed V_b and the target brake deceleration A_brake set in advance at step S134. The target arithmetic unit 54*b* calculates the target brake operation starting position X_b based on the target brake operation starting vehicle speed V_b and the target brake deceleration A_brake by setting the reference stop position (point with the distance L from the current point) as a reference position. That is, the target arithmetic unit 54*b* inversely calculates the brake operation starting position from where the vehicle 2 running at the target brake operation starting vehicle speed V_b can decelerate with the target brake deceleration A_brake by the brake operation to stop at the reference stop position and sets the same as the target brake operation starting position X_b. Meanwhile, the target brake operation starting position X_b is the same position as the target brake operation starting position when the reference stop position is set as the target stop position, that is, that calculated by using the deceleration pattern 100 in FIG. 9. The target brake deceleration A_brake is the value similar to that in the above-described embodiment.

When the target arithmetic unit 54*b* determines the target brake operation starting position X_b at step S134, this calculates the accelerator OFF guiding position X_a' based on the target brake operation starting vehicle speed corrected value V_b', the target brake operation starting position X_b, and prescribed accelerator OFF deceleration A_engBrakeD set in advance at step S136. The accelerator OFF deceleration A_engBrakeD is the value similar to that in the above-described embodiment.

The target arithmetic unit 54*b* calculates the accelerator OFF guiding position X_a' based on the accelerator OFF deceleration A_engBrakeD and the target brake operation starting vehicle speed corrected value V_b' by setting the target brake operation starting position X_b as a reference position. That is, the target arithmetic unit 54*b* inversely calculates the OFF position of the accelerator operation from where the vehicle 2 can decelerate with the accelerator OFF deceleration A_engBrakeD to make the vehicle speed of the vehicle 2 the target brake operation starting vehicle speed corrected value V_b' at the target brake operation starting position X_b, and sets the same as the accelerator OFF guiding position X_a'.

When the target arithmetic unit 54*b* calculates the accelerator OFF guiding position X_a' at step S136, this starts the outputting process of the driving support information by using the HMI device 4. The target arithmetic unit 54*b* outputs the driving support information related to the accelerator OFF guiding support at timing at which the vehicle 2 arrives at the accelerator OFF guiding position X_a' at the current vehicle speed at step S138. Then, the HMI device 4 displays HMI related to the accelerator OFF guiding support as the driving support information. When the OFF operation of the accelerator operation of the driver is actually performed, the braking/driving force controller 54*c* performs the braking/driving force control to adjust such that the actual deceleration of the vehicle 2 reaches the prescribed accelerator OFF D range deceleration A_engBrakeD as in the above-described embodiment.

The braking/driving force controller 54*c* of this embodiment calculates the timing to switch the engine braking, that is, the timing to switch the accelerator OFF deceleration based on the current vehicle speed V_now of the vehicle 2 and the remaining distance L from the current position to the reference stop position at step S140. The braking/driving force controller 54*c* switches the engine braking at timing at which an inequality sign in following (Equation 2) is satisfied, for example. That is the braking/driving force controller 54*c* switches the accelerator OFF deceleration from the accelerator OFF D range deceleration A_engBrakeD to accelerator OFF B range deceleration A_engBrakeB. Then, the braking/driving force controller 54*c* adjusts such that the actual deceleration of the vehicle 2 reaches the accelerator OFF B range deceleration A_EngBrakeB and finishes a current control period to shift to a next control period.

$$V_{now} > V_b' + \sqrt{V_{now}^2 - 2 \cdot A_{EngBrakeB} \cdot (L - X_b)} \qquad (2)$$

In Equation (2) above, [V_now] represents the current vehicle speed of the vehicle 2 at which the driver performs the OFF operation of the accelerator operation. [V_b'] represents the target brake operation starting vehicle speed corrected value. [A_EngBrakeB] represents the accelerator OFF B range deceleration. [L] represents the remaining distance from the current position to the reference stop position at timing at which the OFF operation of the accelerator operation of the driver is actually performed. [X_b] represents the target brake operation starting position.

The driving support apparatus 1 configured in the above-described manner can guide/support the timing of the OFF operation of the accelerator operation of the driver such that the vehicle speed reaches the target brake operation starting vehicle speed corrected value V_b' when the vehicle 2 arrives at the target brake operation starting position X_b by performing the accelerator OFF guiding display at the point X_a'. As a result, the driving support apparatus 1 can appropriately guide such that the deceleration requested according to the brake operation reaches the optimal target brake deceleration A_brake when the driver actually performs the brake operation for stopping at the stop position, so that the high fuel economy improving effect can be realized.

The driving support apparatus 1 configured in the above-described manner can further decrease the vehicle speed at the arrival at the target brake operation starting position X_b by calculating the estimated variation distance Y and correcting the target brake operation starting vehicle speed V_b to the target brake operation starting vehicle speed corrected value V_b' according to the estimated variation distance Y as illustrated in FIGS. 8 and 9. According to this, the driver can stop on a near side of the reference stop position by starting to decelerate with the optimal target brake deceleration A_brake at the target brake operation starting position X_b. That is, it is possible to stop with the appropriate deceleration pattern on a nearer side than in the case of the deceleration pattern 100 by using the target brake operation starting vehicle speed corrected value V_b' as represented by a deceleration pattern 104.

Although the target brake operation starting vehicle speed corrected value V_b' is calculated by correcting the target brake operation starting vehicle speed V_b based on the estimated variation distance Y in the above-described embodiment, there is no limitation. The target arithmetic unit 54*b* calculates the target brake operation starting position X_b as a predetermined point based on the target brake operation starting vehicle speed V_b and the target brake deceleration A_brake set in advance by setting the reference stop position as the reference position. The target arithmetic unit 54*b* may further make the speed at which it is stopped at the point with the distance L−Y from the current point by decelerating with the target brake deceleration A_brake from the target brake operation starting position X_b the target brake operation starting vehicle speed corrected value based on the target brake deceleration A_brake and the target brake operation starting position X_b based on the target stop position according to the remaining distance (point with the distance L−Y from the current point).

Figure 11:
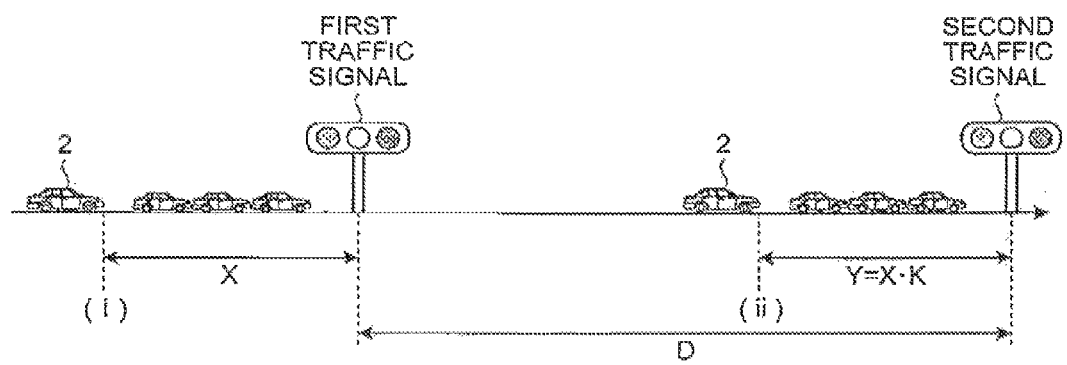
FIG. 11 is a schematic diagram of an example of a situation to which the control by the ECU is applied.
Figure 12:
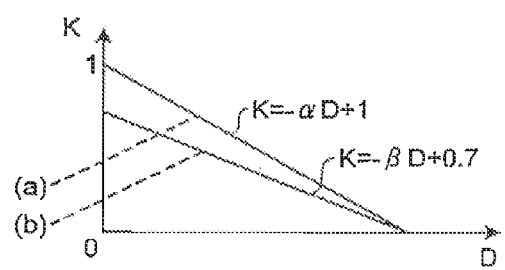
FIG. 12 is a graph of an example of a relationship between a forgetting coefficient K and an inter-traffic signal distance D.

Next, a method of calculating the estimated variation distance Y is described with reference to FIGS. 11, 12, and 13. Herein, FIG. 11 is a schematic diagram of an example of a situation to which the control by the ECU is applied, FIG. 12 is a graph of an example of a relationship between a forgetting coefficient K and an inter-traffic signal distance D, and FIG. 13 is a flowchart of an example of the control by the ECU. Meanwhile, a process illustrated in FIG. 13 may be performed by each unit of the ECU 50, specifically, the first information arithmetic unit 51, the second information arithmetic unit 52, and the third information arithmetic unit 53. Meanwhile, the ECU 50 may also be separately provided with an arithmetic unit which determines the estimated variation distance Y. The ECU 50 repeatedly executes the process illustrated in FIG. 13 during the travel.

An example in which the target arithmetic unit 54*b* calculates the estimated variation distance in the situation illustrated in FIG. 11 is hereinafter described. FIG. 11 illustrates the situation in which the vehicle 2 stops by stop indication on the red light of a first traffic signal located in the travel direction of the vehicle 2 and then stops by the stop indication on the red light of a second traffic signal located in the travel direction of the vehicle 2 after the first traffic signal. As illustrated in FIG. 11, there are the preceding vehicles in front of the vehicle 2 in the travel direction (three preceding vehicles in FIG. 11), so that the stop position at which the vehicle 2 stops by the stop indication of the first traffic signal (position indicated by (i) in FIG. 11) is a position of a fourth vehicle from the first traffic signal. Typically, the signal changing timing of the traffic signal is the same for each group of a plurality of traffic signals located in a predetermined range, so that it is highly possible that the fourth vehicle at the first traffic signal is also the fourth vehicle at the next second traffic signal. That is, it is highly possible that a remaining distance from the stop position at which the vehicle 2 stops by the stop indication of the first traffic signal to the point of the first traffic signal (distance represented by "X" in FIG. 11) is similar at the second traffic signal.

When the inter-traffic signal distance (distance represented by "D" in FIG. 11) from the point of the first traffic signal to the point of the second traffic signal is short, it is highly possible that the remaining distance is similar to that at the first traffic signal also at the second traffic signal; however, when the inter-traffic signal distance is long, possibility that the remaining distance at the second traffic signal is similar to that at the first traffic signal is low. That is, when the inter-traffic signal distance is short, the number of preceding vehicles is less likely to change and the signal changing timing is less likely to change between the traffic signals; however, when the inter-traffic signal distance is long, the number of preceding vehicles is likely to change and the signal changing timing is likely to change between the traffic signals. Therefore, the target arithmetic unit 54*b* multiplies a predetermined forgetting coefficient (K) by the remaining distance at the first traffic signal to calculate the estimated variation distance (Y) for the second traffic signal obtained by correcting the remaining distance at the first traffic signal and determines a position obtained by moving from the point of the second traffic signal to a near side by the estimated variation distance as the target stop position (position represented by (ii) in FIG. 11) at which the vehicle 2 stops by the stop indication of the second traffic signal.

As illustrated in FIG. 12, the longer the inter-traffic signal distance (D) from the point of the first traffic signal to the point of the second traffic signal, the smaller the value of the forgetting coefficient. Herein, when the vehicle 2 changes a lane (lane change), the target arithmetic unit 54*b* changes the forgetting coefficient to a value smaller than the value of the forgetting coefficient before the lane change. The forgetting coefficient before the lane change of the vehicle 2 is represented by an equation "K=−αD+1" as indicated by (a) in FIG. 12, for example. The forgetting coefficient after the lane change of the vehicle 2 is represented by an equation "K=−βD+0.7" as indicated by (b) in .FIG. 12, for example. That is, when the vehicle 2 changes the lane in which this is running, the number of preceding vehicle is likely to change and the remaining distance at the second traffic signal is less likely to be similar to that at the first traffic signal, so that the target arithmetic unit 54*b* adjusts the value of the estimated variation distance by changing the value of the forgetting coefficient to a smaller value. Meanwhile, although an example in which a next traffic signal after the first traffic signal is the second traffic signal is illustrated in FIG. 11, the target arithmetic unit 54*b* calculates the value of the estimated variation distance also in a case in which there is one or more traffic signal at green between the first and second traffic signals.

Herein, the equations indicated by (a) and (b) in FIG. 12 are exemplary only and the target arithmetic unit 54*b* changes correlation between the forgetting coefficient and the inter-traffic signal distance determined by inclination (α, β) and a coefficient (1, 0.7) of each equation for each traffic signal or period of time. Specifically, the target arithmetic unit 54*b* determines a rate of decrease of the forgetting coefficient based on information indicating change in value of the remaining distance accumulated for each traffic signal or period of time. For example, when the learning information indicating that the value of the remaining distance often significantly changes in combination of the first and second traffic signals is stored in the database 15 in advance, the target arithmetic unit 54*b* changes the inclination (α) of the equation indicated by (a) in FIG. 12 to a large value for drastic approach to a value of 0, for example. When the learning information indicating that there are many cases in which the value of the remaining distance does not change in late night hours is stored in the database 15 in advance, the target arithmetic unit 54*b* changes the inclination (α) of the equation indicated by (a) in FIG. 12 to a small value for gradual approach to a value of 0, for example. The target arithmetic unit 54*b* changes the value of the forgetting coefficient to "0" when the vehicle 2 turns right or left (K=0). That is, it is highly possible that a situation in the travel direction of the vehicle 2 when the vehicle 2 turns right or left is different from the situation in the travel direction of the vehicle 2 before this turns right or left, so that the target arithmetic unit 54b changes the value of the forgetting coefficient to "0" to reset the remaining distance. Meanwhile, the forgetting coefficient may be stored in the database 15 in advance as the leaning information obtained by the actual travel of the vehicle 2 for each traffic signal or period of time or may be stored in an information center and the like outside the vehicle to be obtained as needed.

As illustrated in FIG. 13, the target arithmetic unit 54b determines that the first traffic signal is at red by receiving the traffic signal information including the signal cycle information of the first traffic signal obtained by the traffic signal information obtaining unit 52b of the second information arithmetic unit 52 and thereafter receives the current positional information of the vehicle 2 obtained by the position evaluating unit 51a of the first information arithmetic unit 51 or the position evaluating unit 52a of the second information arithmetic unit 52 to obtain as the stop position of the vehicle 2 by the stop indication on the red light of the first traffic signal (step S150).

Next, the target arithmetic unit 54b calculates a difference between the point of the first traffic signal obtained by receiving the traffic signal information including the positional information of the first traffic signal obtained by the traffic signal information obtaining unit 52b and the stop position of the vehicle 2 by the stop indication of the first traffic signal obtained at step 3150 and calculates the difference as the remaining distance (X) (step S152). Then, the target arithmetic unit 54b determines that the first traffic signal is at green by receiving the traffic signal information including the signal cycle information of the first traffic signal obtained by the traffic signal information obtaining unit 52b after the process at step S152, then shifts to a process at next step S154.

Next, the target arithmetic unit 54b determines whether the vehicle 2 changes the lane based on the current positional information of the vehicle 2 and the map information including the road information stored in the database 15 (step S154). That is, the target arithmetic unit 54b determines whether the vehicle 2 moves from the lane in which this is running to another lane based on the current positional information and the road information.

Next, when it is determined that the vehicle 2 changes the lane at step S154 (step S154: Yes), the target arithmetic unit 54b changes the forgetting coefficient (K) to a value smaller than the value of the forgetting coefficient before the lane change (step S156). The target arithmetic unit 54b changes the forgetting coefficient "K=−αD+1" before the lane change of the vehicle 2 as indicated by (a) in FIG. 12, for example, to the forgetting coefficient "K=−βD+0.7" after the lane change of the vehicle 2 as indicated by (b) in FIG. 12, for example. Thereafter, the procedure shifts to a process at next step S158.

On the other hand, when it is determined that the vehicle 2 does not change the lane at step S154 (step S154: No), the target arithmetic unit 54b subsequently determines whether the vehicle 2 turns right or left based on the current positional information of the vehicle 2 and the map information including the road information stored in the database 15 (step S158). That is, the target arithmetic unit 54b determines whether the vehicle 2 moves to a road other then the road on which this is running based on the current positional information and the road information.

Next, when it is determined that the vehicle 2 turns right or left at step S159 (step S158: Yes), the target arithmetic unit 54b changes the value of the forgetting coefficient (K) to "0" (step S160). Thereafter, the procedure shifts to a process at next step S162. On the other hand, when it is determined that the vehicle 2 does not turn right or left at step S158 (step S158: No), the target arithmetic unit 54b does not perform the process at step S160 and shifts to the process at next step S162.

Next, the target arithmetic unit 54b determines that the second traffic signal is at red by receiving the traffic signal information including the signal cycle information of the second traffic signal obtained by the traffic signal information obtaining unit 52b before the process at step S162 and thereafter multiplies the forgetting coefficient (K) by the remaining distance (X) calculated at step S152 to calculate the estimated variation distance (Y) for the second traffic signal obtained by correcting the remaining distance at the first traffic signal (step S162). Herein, the target arithmetic unit 54b uses the forgetting coefficient stored in the database 15 in advance for each traffic signal or period of time. When the forgetting coefficient is changed to the small value at step S156, the target arithmetic unit 54b calculates the estimated variation distance by using the forgetting coefficient. When the value of the forgetting coefficient is changed to "0" at step S160, the target arithmetic unit 54b calculates the estimated variation distance by using the value of the forgetting coefficient changed to "0". That is, the target arithmetic unit 54b resets the remaining distance by chancing the value of the forgetting coefficient to "0". Thereafter, the process is finished.

As illustrated in FIG. 13, the target arithmetic unit 54b obtains a following effect by calculating the estimated variation distance Y and performing the control illustrated in FIG. 6 or 8. For example, as illustrated in FIG. 11, when this stores the remaining distance (X) from the vehicle 2 to the point of the first traffic signal at the time of previous stop on the red light and provides the stopping support at a current point of the second traffic signal, this can change timing to start the stopping support based on the remaining distance. According to this, it becomes possible to start the stopping support at optimal timing in consideration of a gap of the target stop position of the vehicle 2 at the time of current stop from the point of the second traffic signal due to the presence of the preceding vehicle estimated from the remaining distance at the time of last stop. Since the timing to start the stopping support is changed based on the estimated variation distance (Y) for the second traffic signal obtained by correcting the remaining distance at the first traffic signal based on the forgetting coefficient (K), the timing to start the stopping support can be more appropriately set in consideration of the fact that a previous effect of the presence of the preceding vehicle becomes smaller as is away from the point of the first traffic signal at the previous stop. Since the correlation between the forgetting coefficient and the inter-traffic signal distance (D) is changed for each position of the traffic signal and period of time, the timing to start the appropriate stopping support can be set according to various travel environments. Since it is possible to set the timing to start the stopping support without consideration of the remaining distance when the vehicle 2 turns right or left, so that it is possible to reset the remaining distance each time the road on which the vehicle 2 runs is changed, and as a result, it is possible to set the timing to start the stopping support without consideration of the effect of the presence of the preceding vehicle on the road of the vehicle 2 before this turns right or left.

Meanwhile, the above-described driving support apparatus according to the embodiment of the present invention is not limited to the above-described embodiment and can be variously modified within the scope of claims. The driving support apparatus according to this embodiment may also be formed by appropriate combination of the components of above-described each embodiment.

Although the ECU 50 is described above to serve as a support control device and a deceleration control device, there is no limitation. For example, the support control device and the deceleration control device may be formed separately from the ECU 50 so as to be configured to communicate the information such as the detection signal, the drive signal, the control instruction and the like with each other.

Although the target travel state quantity is described above to be the target brake operation starting vehicle speed as the recommended vehicle speed at which the brake operation (braking request operation) by the driver is recommended, there is no limitation. The target travel state quantity only has to be the target state quantity indicating the travel state of the vehicle, and this may be target vehicle acceleration/deceleration, a target gear ratio (target gear position), a target operation angle and the like, for example.

Although it is described above that the driving support apparatus guides/supports the driver in performing the OFF operation of the accelerator operation (release operation of the acceleration request operation) as the recommended driving operation, that is, the driving supported by the driving support apparatus by the driver, there is no limitation. The recommended driving operation of the driver guided/supported by the driving support apparatus may be the acceleration request operation, the braking request operation, the release operation of the braking request operation, speed changing operation, steering operation and the like.

Although the driving support apparatus is described above to output the visual information as the driving support information, the information is not limited to this. The driving support apparatus may also output the sound information, the tactile information and the like as the driving support information, for example, and may be configured to appropriately change a mode of the sound information and the tactile information.

Although the driving support apparatus 1 of this embodiment uses the millimeter-wave sensor 16 as preceding vehicle detecting means for detecting the preceding vehicle (vehicle in front), there is no limitation. A camera which obtains an image in front of the vehicle 2 can also be used as the preceding vehicle detecting means. The driving support apparatus 1 may also analyze the image obtained by the camera to detect the preceding vehicle in front in the travel direction.

REFERENCE SIGNS LIST

1 DRIVING SUPPORT APPARATUS
2 VEHICLE
3 VEHICLE CONTROL SYSTEM
4 HMI DEVICE (SUPPORT DEVICE)
5 ENGINE (INTERNAL COMBUSTION ENGINE)
6 MOTOR GENERATOR, MG (ELECTRIC MOTOR)
13 GPS DEVICE
14 WIRELESS COMMUNICATION DEVICE
15 DATABASE
50 ECU (SUPPORT CONTROL DEVICE, DECELERATION CONTROL DEVICE)
 51 FIRST INFORMATION ARITHMETIC UNIT
 52 SECOND INFORMATION ARITHMETIC UNIT
 53 THIRD INFORMATION ARITHMETIC UNIT
 54 VEHICLE CONTROLLER
 55 CAN
 60 ACCELERATOR OFF GUIDING HMI DETERMINING UNIT
 62 ENGINE BRAKING ENLARGEMENT DETERMINING UNIT
 64 ENGINE EARLY OFF DETERMINING UNIT
 66 DRIVER MODEL CALCULATING UNIT
 68 ENGINE ON/OFF DETERMINING UNIT

The invention claimed is:

1. A driving support apparatus which supports driving of a vehicle, comprising:
   a support control device configured to calculate, based on a remaining distance from a stop position at which the vehicle stops by stop indication of a first traffic signal located in a travel direction of the vehicle to a point of the first traffic signal, an estimated variation distance for a second traffic signal located in the travel direction of the vehicle after the first traffic signal, and create a target vehicle travel state obtained by changing timing to start stopping support at the second traffic signal based on the estimated variation distance; and
   a support device capable of outputting driving support information to support the driving of the vehicle based on a target travel state quantity calculated by the support control device.

2. The driving support apparatus according to claim 1, wherein
   the support control device determines a target stop position at which the vehicle stops by stop indication of the second traffic signal based on a difference between the estimated variation distance and a reference stop position of the second traffic signal, and creates the target vehicle travel state further based on the target stop position, thereby changing the timing to start the stopping support.

3. The driving support apparatus according to claim 2, wherein
   the support control device multiplies a forgetting coefficient by the remaining distance to calculate the estimated variation distance obtained by correcting the remaining distance.

4. The driving support apparatus according to claim wherein
   the support control device corrects a target vehicle speed at the time braking by brake is started for the second traffic signal based on the estimated variation distance, and creates the target vehicle travel state further based on the corrected target vehicle speed at the time the braking by brake is started, thereby changing the timing to start the stopping support.

5. The driving support apparatus according to claim 4, wherein
   the support control device multiplies a forgetting coefficient by the remaining distance to calculate the estimated variation distance obtained by correcting the remaining distance.

6. The driving support apparatus according to claim 1, wherein
   the support control device multiplies a forgetting coefficient by the remaining distance to calculate the estimated variation distance obtained by correcting the remaining distance.

7. The driving support apparatus according to claim 6, wherein
   the forgetting coefficient is smaller, as an inter-traffic signal distance from the point of the first traffic signal to a point of the second traffic signal is longer.

8. The driving support apparatus according to claim 7, wherein
   the support control device changes correlation between the forgetting coefficient and the inter-traffic signal distance for each traffic signal or period of time.

9. The driving support apparatus according to claim 7, wherein
at the time the vehicle makes a lane change, the support control device changes the forgetting coefficient to a value smaller than a value of the forgetting coefficient before the lane change.

10. The driving support apparatus according to claim 7, wherein
at the time the vehicle turns right or left, the support control device changes the value of the forgetting coefficient to 0.

11. The driving support apparatus according to claim 6, wherein
the support control device changes correlation between the forgetting coefficient and an inter-traffic signal distance from the point of the first traffic signal to a point of the second traffic signal for each traffic signal or period of time.

12. The driving support apparatus according to claim 6, wherein
the support control device determines a rate of decrease of the forgetting coefficient based on information indicating a change in value of the remaining distance accumulated for each of the traffic signal or the period of time.

13. The driving support apparatus according to claim 12, wherein
at the time the vehicle makes a lane change, the support control device changes the forgetting coefficient to a value smaller than a value of the forgetting coefficient before the lane change.

14. The driving support apparatus according to claim 11, wherein
at the time the vehicle makes a lane change, the support control device changes the forgetting coefficient to a value smaller than a value of the forgetting coefficient before the lane change.

15. The driving support apparatus according to claim 11, wherein
at the time the vehicle turns right or left, the support control device changes the value of the forgetting coefficient to 0.

16. The driving support apparatus according to claim 6, wherein
at the time the vehicle makes a lane change, the support control device changes the forgetting coefficient to a value smaller than a value of the forgetting coefficient before the lane change.

17. The driving support apparatus according to claim 6, wherein
at the time the vehicle turns right or left, the support control device changes the value of the forgetting coefficient to 0.

18. The driving support apparatus according to claim 1, wherein
the support device outputs the driving support information to support in encouraging recommended driving operation.

19. The driving support apparatus according to claim 18, wherein
the driving support information includes information to provide instruction to release acceleration request operation and braking request operation.

20. The driving support apparatus according to claim 18, wherein
the driving support information includes information to provide instruction to start a braking request operation.

* * * * *